United States Patent
Kubota et al.

(10) Patent No.: US 9,146,382 B2
(45) Date of Patent: Sep. 29, 2015

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/712,962

(22) Filed: May 15, 2015

(65) Prior Publication Data

US 2015/0247991 A1    Sep. 3, 2015

Related U.S. Application Data

(63) Continuation of application No. 14/254,914, filed on Apr. 17, 2014.

(30) Foreign Application Priority Data

Apr. 27, 2013    (JP) .................................. 2013-094811

(51) Int. Cl.
   *G02B 3/02*      (2006.01)
   *G02B 13/00*     (2006.01)
   *G02B 9/60*      (2006.01)

(52) U.S. Cl.
   CPC .............. *G02B 13/0045* (2013.01); *G02B 9/60* (2013.01)

(58) Field of Classification Search
   CPC .................................................. G02B 13/0045
   USPC ............................................................ 359/714
   See application file for complete search history.

(56) References Cited

U.S. PATENT DOCUMENTS

| 2012/0087020 A1* | 4/2012 | Tang et al. ..................... 359/714 |
| 2013/0077181 A1 | 3/2013 | Chen et al. |
| 2014/0218584 A1 | 8/2014 | Liu et al. |

FOREIGN PATENT DOCUMENTS

JP    2012-113311 A    6/2012

* cited by examiner

*Primary Examiner* — James Jones
(74) *Attorney, Agent, or Firm* — Kubotera & Associates, LLC

(57) ABSTRACT

An imaging lens includes a first lens having positive refractive power; a second lens having negative refractive power; a third lens having negative refractive power; a fourth lens; and a fifth lens having negative refractive power, arranged in this order from an object side to an image plane side. The first lens is formed in a shape so that a surface thereof on the object side has a positive curvature radius. The third lens is formed in a shape so that a surface thereof on the image plane side has a positive curvature radius. The fifth lens is formed in a shape so that a surface thereof on the object side has a negative curvature radius, and a surface thereof on the image plane side has a positive curvature radius. The first to third lenses have specific Abbe's numbers. The second and third lenses have specific focal lengths.

18 Claims, 15 Drawing Sheets

IMAGING LENS

CROSS-REFERENCE TO RELATED APPLICATIONS

This is a continuation application of a prior application Ser. No. 14/254,914, filed on Apr. 17, 2014, pending, which claims priority of Japanese Patent Application No. 2013-094811, filed on Apr. 27, 2013.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera, such as a camera to be mounted in a portable device, e.g., a cellular phone and a portable information terminal, a digital still camera, a security camera, a vehicle onboard camera, and a network camera.

In these years, in place of cellular phones that are intended mainly for making phone calls, so-called "smartphones" have been more widely used, i.e., cellular phones with such functions as those of portable information terminals (PDA) and/or personal computers. Since the smartphones in general are highly functional as opposed to the cellular phones, it is possible to use images taken by a camera thereof in various applications. For example, in case of the smartphone, while it is possible to print and enjoy images taken as in an intended use, it is also possible to use images in additional uses such as processing images to be used in games or for makeup simulations, dress fitting simulations, and the others. Such uses of the images, although not common previously, are becoming increasingly popular every year.

Generally speaking, a product group of cellular phones and smartphones is often composed of products with various specifications such as those for beginners and those for advanced users. Among them, an imaging lens to be mounted in the cellular phone or the smartphone, which is developed for advanced users, is required to have a high resolution lens configuration so as to be also applicable to a high pixel count imaging element of these days. However, when the imaging lens to be mounted in smartphones is used in the above-described usages, it is critical to have a small size and a wide angle of view, that is, a wide angle, rather than having a high resolution. Especially recently, as the smartphones have smaller sizes and higher functionalities, imaging lenses having a smaller size and a wider angle are more demanded.

Accordingly, in case of the cellular phones and smartphones, depending on their positions in the product group, specification of the imaging lens to be mounted in the cellular phones and smartphones is slightly different. Although it is originally preferred to select a lens configuration most suitable for each required specification, it is also necessary to shorten a development period, reduce cost, etc., so that an imaging lens having a high resolution, a small size and a wide angle has been developed.

Since a lens configuration that is composed of five lenses has more flexibility in designing, such a lens configuration is expected to be applied to a next-generation imaging lens. Patent Reference, for example, has disclosed the imaging lens having the five-lens configuration. The imaging lens includes a first lens having positive refractive power, a second lens having negative refractive power, a third lens having positive or negative refractive power, a fourth lens having positive refractive power, and a fifth lens having negative refractive power, arranged in the order from an object side.

In the configuration described in Patent Reference, the first lens is formed in a shape so as to direct a convex surface thereof to the object side, and the second lens is formed in a shape so as to direct a concave surface thereof to the image plane side. In addition, the fourth lens is formed in a shape so as to direct a convex surface thereof to the image plane side and the fifth lens is formed as an aspheric shape having an inflexion point, which directs a concave surface thereof to the image plane side. Among them, the first lens and the second lens are made of lens materials having different Abbe's numbers such that a difference thereof becomes between 20 and 70. Accordingly, chromatic aberrations thereof are satisfactorily corrected, also with the refractive power arrangement and shapes of the respective lenses. According to the imaging lens described in Patent Reference, an aspheric surface is suitably applied, so that an incident angle of a light beam emitted from the imaging lens to an imaging element is also restrained and reduction of the peripheral light quantity due to shading is also restrained.

Patent Reference: Japanese Patent Application Publication No. 2012-113311

According to the imaging lens described in Patent Reference, a total length of the imaging lens tends to be elongated. Accordingly, although it is possible to obtain relatively satisfactory aberration, it is difficult to sufficiently satisfy demands for downsizing in these years. In addition, cameras equipped with the above-described imaging lens have been used in more various ways each year. Therefore, it is more demanded that the imaging lens has a small size and is applicable to a high resolution, which is accompanied with a higher pixel count of an imaging element, as well as having a wide angle so as to be applied for a wide imaging area. With the lens configuration described in Patent Reference, it is difficult to satisfy those demands in a well-balanced manner.

In view of the above-described problems in the conventional techniques, an object of the present invention is to provide an imaging lens that can attain a wide angle despite of a small size and effectively correct aberrations.

Further objects and advantages of the invention will be apparent from the following description of the invention.

SUMMARY OF THE INVENTION

In order to attain the objects described above, according to a first aspect of the present invention, an imaging lens includes a first lens having positive refractive power; a second lens having negative refractive power; a third lens having negative refractive power; a fourth lens having positive refractive power; and a fifth lens having negative refractive power, arranged in the order from an object side to an image plane side. The first lens has an object-side surface, a curvature radius of which is positive, and an image plane-side surface, a curvature radius of which is negative. The second lens has an object-side surface, a curvature radius of which is negative. The third lens has an object-side surface and an image plane-side surface, curvature radii of which are both positive. Among them, the image plane-side surface of the third lens is formed as an aspheric shape having an inflexion point. The fourth lens has an object-side surface and an image plane-side surface, curvature radii of which are both negative.

According to the first aspect of the present invention, when the first lens has Abbe's number vd1, the second lens has Abbe's number vd2, the whole lens system has a focal length f, and a composite focal length of the fourth lens and the fifth lens is f45, the imaging lens of the invention satisfies the following conditional expressions (1) to (3):

$$45 < vd1 < 75 \tag{1}$$

$$20 < vd2 < 35 \tag{2}$$

$$-10.0 < f45/f < -1.0 \tag{3}$$

In order to improve optical performances of the imaging lens, in addition to satisfactorily correcting aberrations, it is also important to restrain generation of a chromatic aberration, which affects the resolution to be high or low, as much as possible. When the imaging lens satisfies the conditional expressions (1) and (2), it is achievable to satisfactorily correct axial and off-axis chromatic aberrations.

When it is attempted to attain a wider angle in an imaging lens, it is necessary to shorten a focal length of the imaging lens, in comparison with a conventional imaging lens, when the size of an image plane of an imaging element is the same. As the focal length is shorter, a total length of the imaging lens becomes relatively shorter for the size of an image plane of the imaging element, so that it is difficult to restrain an incident angle of a light beam emitted from an imaging lens to an imaging element within the range of an incident angle of a light beam that can be taken in the imaging element, i.e., so-called chief ray angle (CRA).

When the imaging lens satisfies the conditional expression (3), it is achievable to restrain a chromatic aberration and a field curvature within satisfactory ranges and restrain an incident angle of a light beam emitted from an imaging lens to an imaging element within range of the chief ray angle while attaining downsizing of the imaging lens. When the value exceeds the upper limit of "−1.0", although it is effective for downsizing of the imaging lens, an image-forming surface curves to the object side, so that it is difficult to obtain satisfactory image-forming performance. In addition, an axial chromatic aberration is insufficiently corrected (a focal position at a short wavelength moves to an object side relative to a focal position at a reference wavelength), and a chromatic aberration of magnification for an off-axis light at periphery of an image is excessively corrected (an image-forming point at a short wavelength moves in a direction to be away from the optical axis, relative to an image-forming point at a reference wavelength), so that it is difficult to obtain satisfactory image-forming performance. In addition, it is difficult to restrain an incident angle of a light beam emitted from the imaging lens to an imaging element within the range of chief ray angle, so that so-called shading, which makes periphery of an image dark relative to a center part of the image, easily occurs.

On the other hand, when the value is below the lower limit of "−10.0", while it is easy to restrain the incident angle of a light beam emitted from the imaging lens to the imaging element within the range of chief ray angle, the image-forming surface curves to the image plane side, and the chromatic aberration of magnification is insufficiently corrected (an image-forming point at a short wavelength moves to a direction to be close to the optical axis, relative to an image-forming point at a reference wavelength), and also in this case, it is difficult to obtain satisfactory image-forming performance.

In these years, as an index for a size of an imaging lens, in addition to a distance on an optical axis from an object-side surface of a first lens of an imaging lens to an image plane, a ratio, the distance on the optical axis divided by a size of an image plane, becomes more frequently used. In case of mounting an imaging lens in a small-sized camera, the ratio, i.e., a low profile, is often the key rather than being simply small. As shown in the conditional expression (3), since the value of f45 is negative, the imaging lens of the invention has a lens configuration that can easily attain low profile.

Furthermore, according to the imaging lens of the invention, there are three lenses that have negative refractive power and f45 has negative refractive power, so that there remains concern in correction of off-axial chromatic aberration of magnification, which easily occurs in an imaging lens having a wide angle. For this reason, in the imaging lens of the invention, the third lens is formed as an aspheric shape having an inflexion point on an image plane-side surface, i.e. a shape in which the negative refractive power gradually decreases toward the periphery. With this configuration, the off-axis chromatic aberration of magnification is satisfactorily corrected.

The imaging lens having the above-described configuration preferably further satisfies the following conditional expression (3A):

$$-8.0 < f45/f < -1.0 \tag{3A}$$

According to a second aspect of the present invention, when a composite focal length of the first lens and the second lens is f12, the imaging lens having the above-described configuration preferably satisfies the following conditional expression (4):

$$-1.0 < f12/f45 < -0.2 \tag{4}$$

When the imaging lens satisfies the conditional expression (4), it is achievable to restrain a spherical aberration, a coma aberration, and a chromatic aberration within preferred ranges while attaining a small size thereof. When the imaging lens satisfies the conditional expression (4), it is also achievable to restrain an incident angle of a light beam emitted from the imaging lens to the imaging element within the range that is set in advance. When the value exceeds the upper limit of "−0.2", since composite refractive power of the first lens and the second lens is strong relative to composite refractive power of the fourth lens and the fifth lens, although it is advantageous for downsizing of the imaging lens and correcting an axial chromatic aberration and a chromatic aberration of magnification, it is difficult to secure a back focal length. In addition, it is also difficult to restrain an incident angle of a light beam emitted from the imaging lens to the imaging element within the range that is set in advance. On the other hand, when the value is below the lower limit of "−1.0", although it is easy to restrain the incident angle of a light beam emitted from the imaging lens to the imaging element within the range that is set in advance, it is difficult to attain downsizing of the imaging lens. In addition, the axial chromatic aberration is insufficiently corrected and the chromatic aberration of magnification is insufficiently corrected (an image-forming point at a short wavelength moves in a direction to be close to the optical axis, relative to an image-forming point at a reference wavelength), and it is difficult to obtain satisfactory image-forming performance. Here, in this case, since an outer coma aberration also increases for an off-axis light beam, the image-forming performance is deteriorated.

According to a third aspect of the present invention, the imaging lens having the above-described configuration preferably satisfies the following conditional expression (5):

$$-30 < f3/f < -15 \tag{5}$$

When the imaging lens satisfies the conditional expression (5), it is achievable to restrain an astigmatism, a chromatic aberration, and a distortion within preferred ranges in a well-balanced manner. When the value exceeds the upper limit of "−15", since the third lens has strong refractive power relative to the whole lens system, although it is advantageous for correcting a chromatic aberration, a sagittal image surface of the astigmatism curves to a side of the image plane and the astigmatic difference increases, so that it is difficult to obtain satisfactory image-forming performance. On the other hand, when the value is below the lower limit of "−30", although it is advantageous for correcting an astigmatism, the axial and the off-axis chromatic aberrations are insufficiently corrected and a minus distortion increases, so that it is difficult to obtain satisfactory image-forming performance.

According to a fourth aspect of the present invention, when the second lens has a focal length f2 and the third lens has a focal length f3, the imaging lens having the above-described configuration preferably satisfies the following conditional expression (6):

$$0.01 < f2/f3 < 0.1 \tag{6}$$

When the imaging lens satisfies the conditional expression (6), it is achievable to restrain a field curvature, a chromatic aberration, and a distortion within preferred ranges in a well-balanced manner while attaining downsizing of the imaging lens. When the value exceeds the upper limit of "0.1", although it is advantageous for downsizing of the imaging lens, the image-forming surface curves towards the object side and the axial and the off-axis chromatic aberrations are insufficiently corrected. In addition, since the distortion increases in a negative direction, it is difficult to obtain satisfactory image-forming performance. On the other hand, when the value is below the lower limit of "0.01", although it is easy to correct chromatic aberration, it is difficult to attain downsizing of the imaging lens. In addition, since the image-forming surface curves to a side of the image plane and the distortion increases in the positive direction, it is difficult to obtain satisfactory image-forming performance.

According to a fifth aspect of the present invention, when a curvature radius of the image plane-side surface of the third lens is R3r and a curvature radius of the object-side surface of the fourth lens is R4f, the imaging lens having the above-described configuration preferably satisfies the following conditional expression (7):

$$-1.0 < R4f/R3r < -0.2 \tag{7}$$

When the imaging lens satisfies the conditional expression (7), it is achievable to restrain the astigmatism and the chromatic aberration of magnification within preferred ranges in a well-balanced manner while securing the flatness of an image-forming surface. When the value exceeds the upper limit of "−0.2", it is difficult to secure the flatness of the image-forming surface and the chromatic aberration of magnification is insufficiently corrected, so that it is difficult to obtain satisfactory image-forming performance. On the other hand, when the value is below the lower limit of "−1.0", it is easy to secure the flatness of the image-forming surface and it is easy to correct the chromatic aberration of magnification, but since the astigmatic difference increases, it is difficult to obtain satisfactory image-forming performance.

Here, the imaging lens of the invention is effective for an imaging lens that is required to have an angle of view (2ω) of 78° or greater (78°≤2ω).

According to the imaging lens of the invention, it is achievable to obtain both a wide angle and satisfactory correction of aberrations, and it is possible to provide a small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
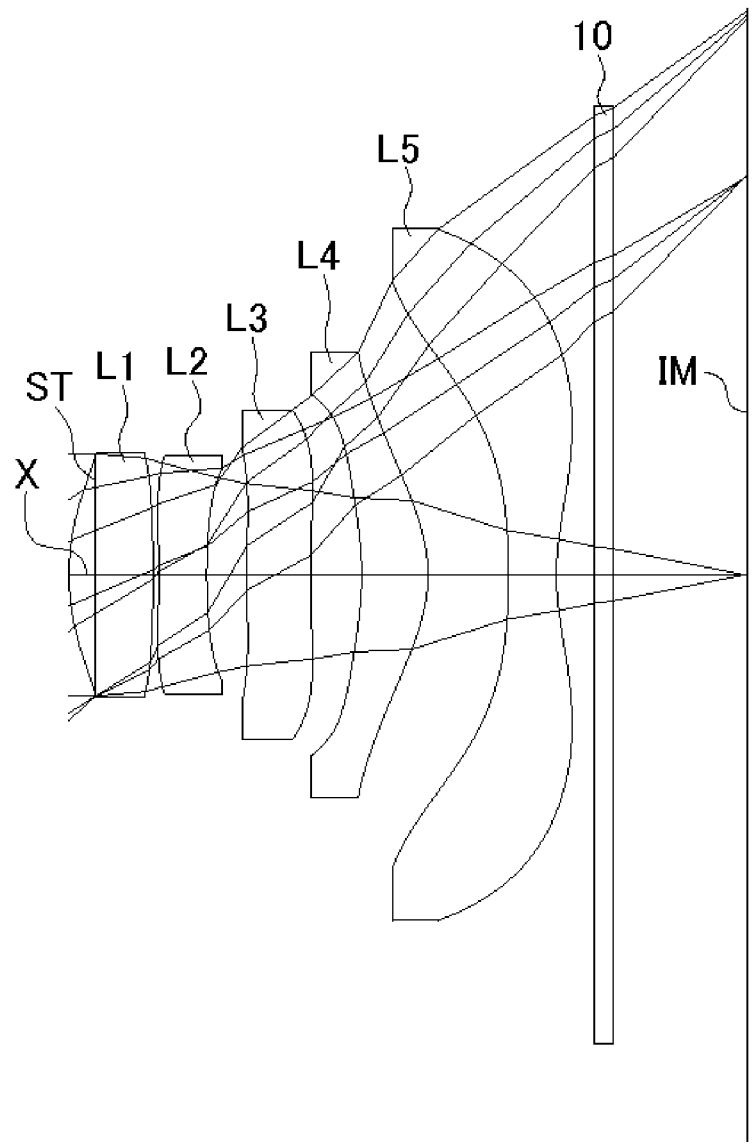
FIG. 1 shows a sectional view of a schematic configuration of an imaging lens in Numerical Data Example 1 according to an embodiment of the invention.

As shown in FIG. 1, the imaging lens of the embodiment includes a first lens L1 having positive refractive power, a second lens L2 having negative refractive power, a third lens L3 having negative refractive power, a fourth lens L4 having positive refractive power, and a fifth lens L5 having negative refractive power, arranged in the order from an object side to an image plane side. Between the fifth lens L5 and the image plane IM, there is provided a filter 10. The filter 10 can be optionally omitted. Here, according to the imaging lens of this embodiment, there is provided an aperture stop ST from a tangent plane at a vertex of an object-side surface of the first lens L1 to an intersection of an image plane-side surface of the first lens L1 and an optical axis X. In order to achieve a small size and low profile of the imaging lens, the aperture stop ST is preferably a so-called "front stop"-type aperture stop, in which the aperture stop ST is disposed closer to the object side than the intersection of the image plane-side surface of the first lens L1 and the optical axis X.

According to the imaging lens of this embodiment, the first lens L1 is made of a material having Abbe's number between 45 and 75, and the second lens L2 is made of a material having Abbe's number between 20 and 35. More specifically, when the first lens L1 has Abbe's number vd1 and the second lens L2 has Abbe's number vd2, the imaging lens of the embodiment satisfies the following conditional expressions (1) and (2):

$$45<vd1<75 \quad (1)$$

$$20<vd2<35 \quad (2)$$

In addition, when the third lens L3 has Abbe's number vd3, the fourth lens L4 has Abbe's number vd4, and the fifth lens L5 has Abbe's number vd5, the imaging lens of the embodiment further satisfies the following respective conditional expressions:

$$45<vd3<75$$

$$45<vd4<75$$

$$45<vd5<75$$

Therefore, according to the imaging lens of the embodiment, the first lens L1 and each of the lenses from the third lens L3 to the fifth lens L5 are made of materials having Abbe's numbers between 45 and 75, and the second lens L2 is made of a material having Abbe's number between 20 and 35. Accordingly, four lenses of the five lenses that compose the imaging lens have Abbe's number greater than the lower limit of "45", so that it is possible to effectively restrain a chromatic aberration generated when a light beam passes those four lenses, and thereby it is possible to restrain a chromatic aberration of the whole lens system within satisfactory range.

The first lens L1 is formed in a shape such that a curvature radius r2 of an object-side surface thereof is positive and a curvature radius r3 of an image plane-side surface thereof is negative, and has a shape of a biconvex lens near the optical axis X.

The second lens L2 is formed in a shape such that a curvature radius r4 of an object-side surface thereof is negative and a curvature radius r5 of an image plane-side surface thereof is positive, and has a shape of a biconcave lens near the optical axis X. Here, the shape of the second lens L2 is not limited to the shape that is a biconcave lens near the optical axis X. The shape of the second lens L2 can be any as long as the curvature radius r4 of the object-side surface thereof is negative, and also can be the shape such that the curvature radius r5 is negative, i.e., a shape of a meniscus lens directing a concave surface thereof to the object side near the optical axis X. Numerical Data Examples 1 to 4 are examples, in which the second lens L2 has a shape of a biconcave lens near the optical axis X, and Numerical Data Example 5 is an example, in which the second lens L2 has a shape of a meniscus lens directing a concave surface thereof to the object side near the optical axis X.

The third lens L3 is formed in a shape such that a curvature radius r6 of an object-side surface thereof and a curvature radius r7 of an image plane-side surface thereof are both positive, and has a shape of a meniscus lens directing a convex surface thereof to the object side near the optical axis X. Moreover, the third lens L3 is formed as an aspheric shape having an inflexion point on the image plane-side surface thereof.

The fourth lens L4 is formed in a shape, such that a curvature radius r8 of an object-side surface thereof and a curvature radius r9 of an image plane-side surface thereof are both negative, so as to have a shape of a meniscus lens directing a concave surface thereof to the object side near the optical axis X.

The fifth lens L5 is formed in a shape such that a curvature radius r10 of an object-side surface is negative and a curvature radius r11 of an image plane-side surface thereof is positive, so as to have a shape of a biconcave lens near the optical axis X. In addition, the fifth lens L5 of the imaging lens according to the embodiment is formed as an aspheric shape having negative refractive power near the optical axis X and positive refractive power at periphery of the lens. In short, the fifth lens L5 is formed in a shape of a biconcave lens near the optical axis X, and a shape of a biconvex lens at the periphery of the lens. With such shape of the fifth lens L5, it is possible to satisfactorily correct a chromatic aberration of magnification that easily occurs as the imaging lens has a wider angle, and it is also possible to suitably restrain an incident angle of a light beam emitted from the imaging lens to the image plane IM within the range of chief ray angle.

Furthermore, the imaging lens of the embodiment satisfies the following conditional expressions:

$$-10.0<f45/f<-1.0 \quad (3)$$

$$-1.0<f12/f45<-0.2 \quad (4)$$

$$-30<f3/f<-15 \quad (5)$$

$$0.01<f2/f3<0.1 \quad (6)$$

$$-1.0<R4f/R3r<-0.2 \quad (7)$$

In the above conditional expressions:
f: Focal length of the whole lens system
f2: Focal length of a second lens L2
f3: Focal length of a third lens L3
f12: Composite focal length of the first lens L1 and the second lens L2
f45: Composite focal length of the fourth lens L4 and the fifth lens L5
R3r: Curvature radius of an image plane-side surface of the third lens L3
R4f: Curvature radius of an object-side surface of the fourth lens L4

According to the imaging lens of the embodiment, it is achievable to obtain a small size thereof, a wide angle thereof, and satisfactory correction of aberrations, in well-balanced manner.

The imaging lens of the embodiment preferably further satisfies the following conditional expression (3A):

$$-8.0<f45/f<-1.0 \quad (3A)$$

Here, it is not necessary to satisfy all of the conditional expressions, and it is achievable to obtain an effect corresponding to the respective conditional expression when any single one of the conditional expressions is individually satisfied.

In the embodiment, lens surfaces of each lens are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces is expressed as follows:

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index for a d line, and vd represents Abbe's number for the d line, respectively. Here, aspheric surfaces are indicated with surface numbers i affixed with * (asterisk). Moreover, for reference, the sum of the surface spacing on the optical axis from the object-side surface of the first lens L1 to the image plane IM (length in air for the filter 10) is La, and the maximum image height is indicated as Hm.

Numerical Data Example 1

Basic data are shown below.
f=3.27 mm, Fno=2.6, ω=42.2°

Unit: mm

Surface Data

| Surface Number i | r | d | nd | vd |
|---|---|---|---|---|
| (Object) | ∞ | ∞ | | |
| 1 (Stop) | ∞ | −0.140 | | |
| 2* | 1.238 | 0.440 | 1.544 | 55.6 (=vd1) |
| 3* | −7.636 | 0.030 | | |
| 4* | −6.630 | 0.250 | 1.638 | 23.3 (=vd2) |
| 5* | 3.665 | 0.210 | | |
| 6* | 6.102 | 0.333 | 1.535 | 56.1 (=vd3) |
| 7* | 5.346 (=R3r) | 0.267 | | |
| 8* | −1.607 (=R4f) | 0.347 | 1.544 | 55.6 (=vd4) |
| 9* | −0.772 | 0.421 | | |
| 10* | −3.843 | 0.250 | 1.525 | 56.0 (=vd5) |
| 11* | 1.246 | 0.200 | | |
| 12 | ∞ | 0.100 | 1.517 | 64.2 |
| 13 | ∞ | 0.700 | | |
| (Image plane) | ∞ | | | | f1 = 1.99 mm
f2 = −3.67 mm
f3 = −95.29 mm
f4 = 2.38 mm
f5 = −1.76 mm
f12 = 3.57 mm
f45 = −16.32 mm
La = 3.51 mm
Hm = 2.96

Aspheric Surface Data

Second Surface k = −1.180, $A_4$ = 1.485E−03, $A_6$ = −1.757E−01, $A_8$ = −2.386E−01, $A_{10}$ = −3.473E−01
Third Surface k = 0.000, $A_4$ = −4.595E−02, $A_6$ = −4.501E−02, $A_8$ = −5.980E−02, $A_{10}$ = −1.528, $A_{12}$ = 2.039
Fourth Surface k = 0.000, $A_4$ = 2.775E−01, $A_6$ = 4.381E−01, $A_8$ = −2.765E−01, $A_{10}$ = −1.364, $A_{12}$ = 2.539
Fifth Surface k = 0.000, $A_4$ = 2.719E−01, $A_6$ = 3.789E−01, $A_8$ = −2.340E−01, $A_{10}$ = 6.182E−01, $A_{12}$ = 1.806, $A_{14}$ = −4.048
Sixth Surface k = 0.000, $A_4$ = −3.949E−01, $A_6$ = 1.686E−01, $A_8$ = 1.194E−01, $A_{10}$ = −4.405E−01, $A_{12}$ = 1.206E−01, $A_{14}$ = 1.010, $A_{16}$ = 1.062
Seventh Surface k = 7.681, $A_4$ = −1.857E−01, $A_6$ = −1.747E−01, $A_8$ = 2.614E−02, $A_{10}$ = −1.002E−01, $A_{12}$ = 8.639E−02, $A_{14}$ = 8.939E−02, $A_{16}$ = −6.472E−02
Eighth Surface k = −1.825E+01, $A_4$ = 1.212E−01, $A_6$ = −1.689E−01, $A_8$ = −1.225E−01, $A_{10}$ = 9.822E−03, $A_{12}$ = −4.558E−02, $A_{14}$ = 2.101E−02
Ninth Surface k = −3.759, $A_4$ = 9.767E−03, $A_6$ = 1.593E−01, $A_8$ = −1.787E−01, $A_{10}$ = 8.441E−02, $A_{12}$ = −1.275E−02, $A_{14}$ = −1.146E−03
Tenth Surface k = 0.000, $A_4$ = −2.135E−01, $A_6$ = 7.426E−02, $A_8$ = 5.393E−04, $A_{10}$ = 1.646E−04, $A_{12}$ = −3.436E−04, $A_{14}$ = −1.043E−04
Eleventh Surface k = −1.515E+01, $A_4$ = −1.918E−01, $A_6$ = 9.146E−02, $A_8$ = −2.977E−02, $A_{10}$ = 4.657E−03, $A_{12}$ = −3.577E−04, $A_{14}$ = 2.641E−05, $A_{16}$ = −1.253E−05

The values of the respective conditional expressions are as follows:
R4f/R3r=−0.30
f3/f=−29.18
f12/f45=−0.22
f45/f=−5.00
f2/f3=0.04

Accordingly, the imaging lens of Numerical Data Example 1 satisfies the above-described conditional expressions. Therefore, according to the imaging lens, it is achievable to satisfactorily correct aberrations in spite of a wide angle thereof. In addition, the ratio, the sum La of surface spacing on the optical axis X divided by the maximum image height Hm×2, is 0.59, so that low profile of the imaging lens is suitably attained.

Figure 2:
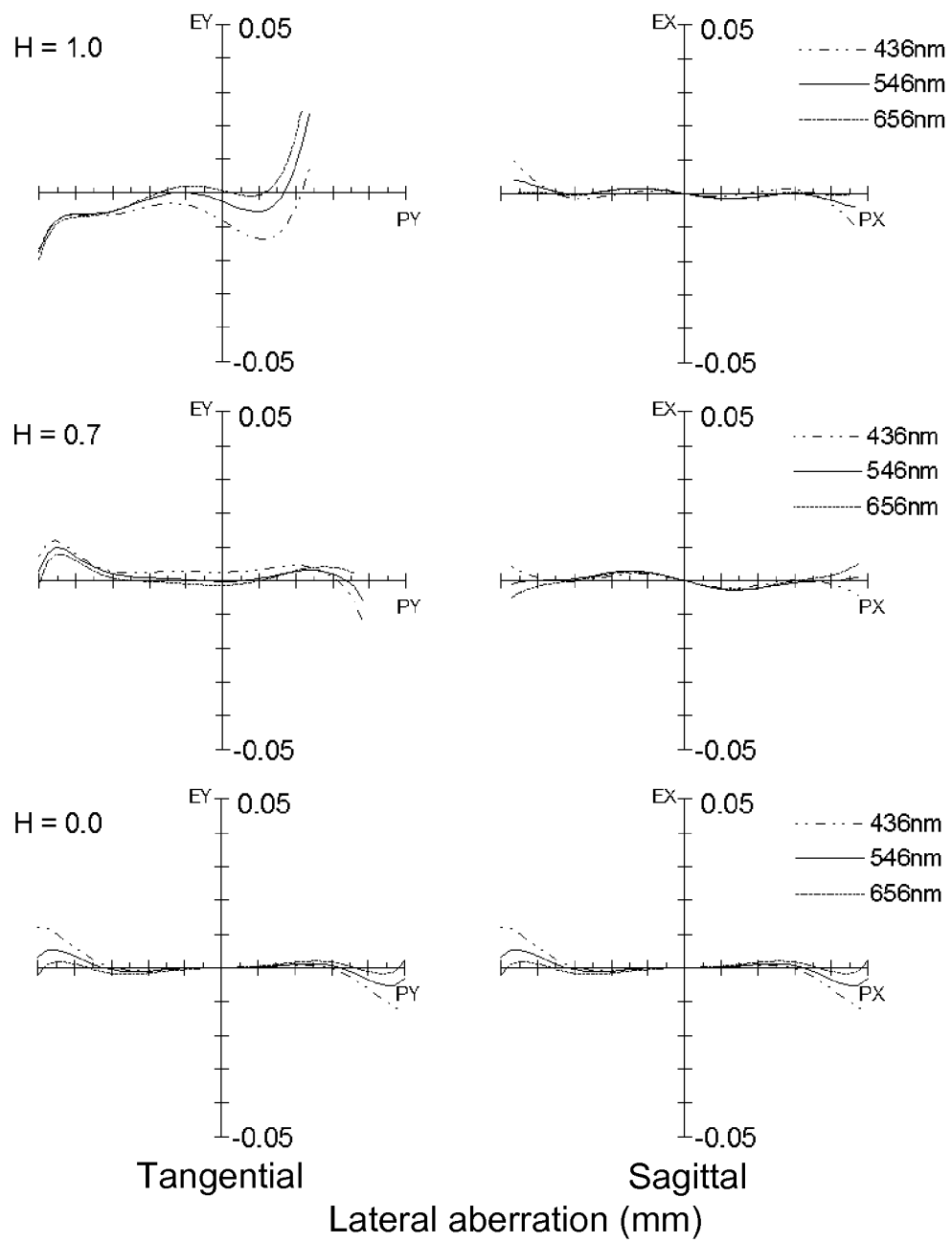
FIG. 2 is an aberration diagram showing a lateral aberration of the imaging lens of FIG. 1.
Figure 3:
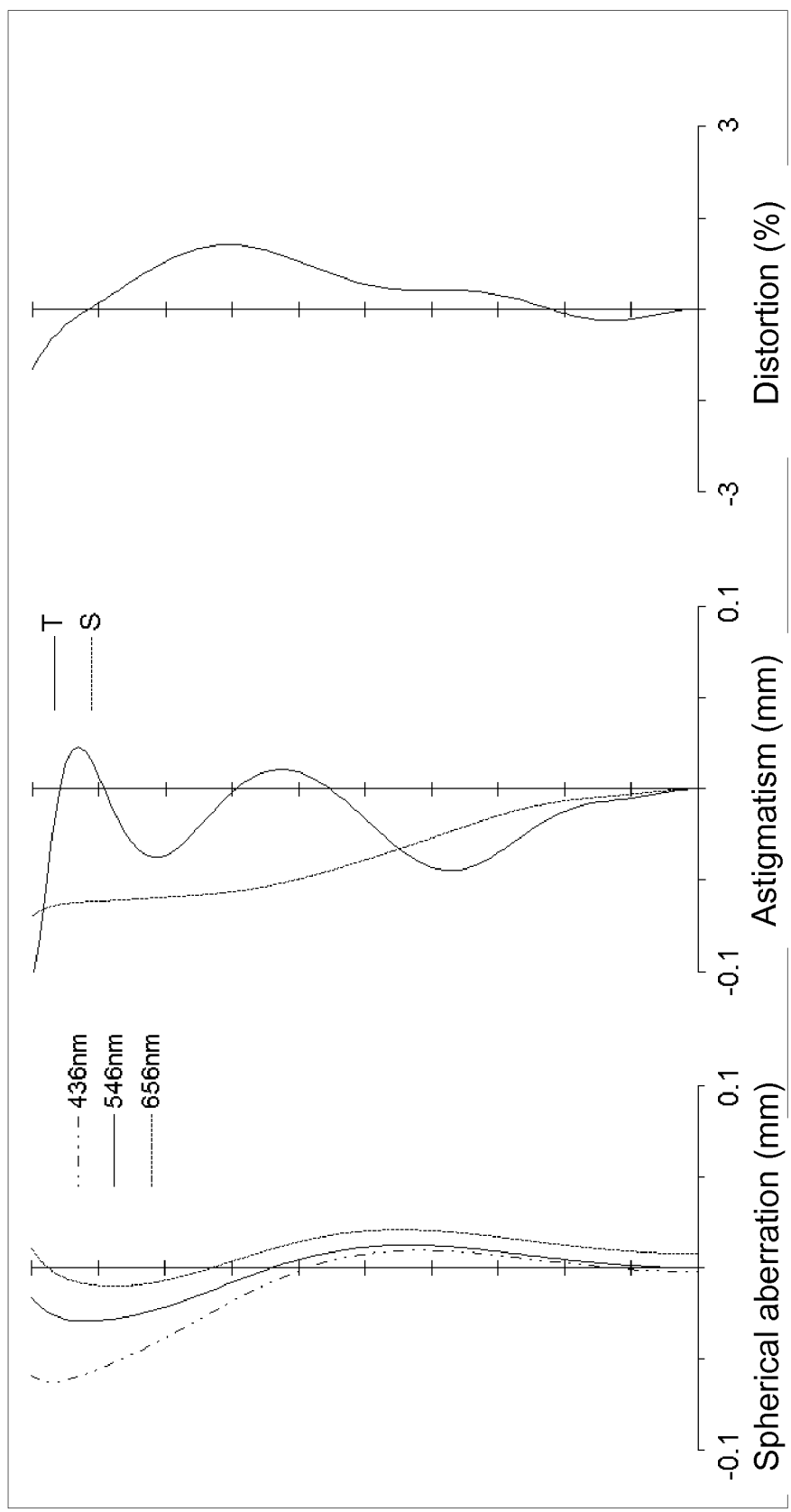
FIG. 3 is an aberration diagram showing a spherical aberration, astigmatism, and a distortion of the imaging lens of FIG. 1.
Figure 4:
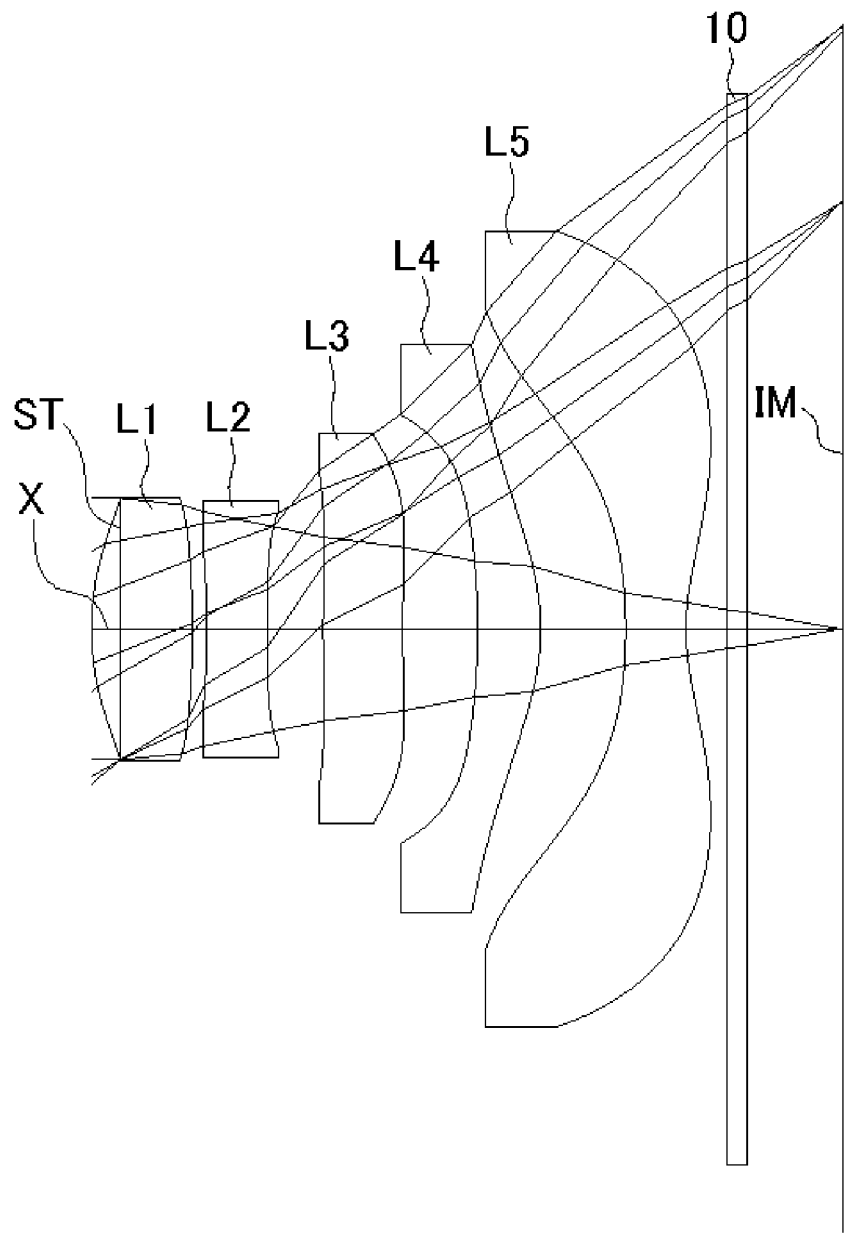
FIG. 4 shows a sectional view of a schematic configuration of an imaging lens in Numerical Data Example 2.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, and 14), in the imaging lens of Numerical Data Example 1. Furthermore, FIG. 3 shows a spherical aberration (mm), astigmatism (mm), and a distortion (%) of the imaging lens of Numerical Data Example 1, respectively. In the aberration diagrams, for the lateral aberration diagrams and spherical aberration diagrams, aberrations at each wavelength of 436 nm, 546 nm, and 656 nm are indicated. In astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, it is achievable to satisfactorily correct the aberrations.

Numerical Data Example 2

Basic data are shown below.

f = 3.58 mm, Fno = 2.8, ω = 39.7°
Unit: mm

Surface Data

| Surface Number i | r | d | nd | vd |
|---|---|---|---|---|
| (Object) | ∞ | ∞ | | |
| 1 (Stop) | ∞ | −0.140 | | |

-continued f = 3.58 mm, Fno = 2.8, ω = 39.7°
Unit: mm

| | | | | |
|---|---|---|---|---|
| 2* | 1.281 | 0.488 | 1.544 | 55.6 (=vd1) |
| 3* | −6.672 | 0.073 | | |
| 4* | −2.990 | 0.291 | 1.638 | 23.3 (=vd2) |
| 5* | 17.871 | 0.271 | | |
| 6* | 5.699 | 0.386 | 1.535 | 56.1 (=vd3) |
| 7* | 5.049 (=R3r) | 0.364 | | |
| 8* | −3.483 (=R4f) | 0.306 | 1.544 | 55.6 (=vd4) |
| 9* | −1.112 | 0.412 | | |
| 10* | −2.455 | 0.291 | 1.525 | 56.0 (=vd5) |
| 11* | 1.089 | 0.200 | | |
| 12 | ∞ | 0.100 | 1.517 | 64.2 |
| 13 | ∞ | 0.460 | | |
| (Image plane) | ∞ | | | | f1 = 2.02 mm
f2 = −3.99 mm
f3 = −104.40 mm
f4 = 2.87 mm
f5 = −1.40 mm
f12 = 3.44 mm
f45 = −3.92 mm
La = 3.61 mm
Hm = 2.96

Aspheric Surface Data

Second Surface $k = -1.231, A_4 = 2.812E-03, A_6 = -8.227E-02, A_8 = -2.075E-01, A_{10} = -4.139E-01$ Third Surface $k = 0.000, A_4 = -1.227E-01, A_6 = -2.524E-02, A_8 = 1.581E-01, A_{10} = -1.396, A_{12} = 9.630E-01$ Fourth Surface $k = 0.000, A_4 = 2.771E-01, A_6 = 2.763E-01, A_8 = -3.512E-01, A_{10} = -8.447E-01, A_{12} = 1.392$ Fifth Surface $k = 0.000, A_4 = 3.381E-01, A_6 = 3.197E-01, A_8 = -4.528E-01, A_{10} = 3.312E-01, A_{12} = 2.130, A_{14} = -3.966$ Sixth Surface $k = 0.000, A_4 = -3.148E-01, A_6 = 1.610E-01, A_8 = 7.190E-02, A_{10} = -3.015E-01, A_{12} = 6.246E-01, A_{14} = 2.838E-01, A_{16} = -1.016$ Seventh Surface $k = -6.829E+01, A_4 = -2.355E-01, A_6 = -1.315E-01, A_8 = 1.128E-01, A_{10} = -6.000E-02, A_{12} = 6.665E-02, A_{14} = 6.632E-02, A_{16} = -6.472E-02$ Eighth Surface $k = 6.331, A_4 = 5.988E-02, A_6 = -1.231E-01, A_8 = -8.573E-02, A_{10} = 2.828E-02, A_{12} = -3.535E-02, A_{14} = 2.409E-02$ Ninth Surface $k = -5.107, A_4 = 2.077E-03, A_6 = 1.526E-01, A_8 = -1.807E-01, A_{10} = 8.401E-02, A_{12} = -1.256E-02, A_{14} = -7.228E-04$ Tenth Surface $k = 0.000, A_4 = -1.990E-01, A_6 = 8.047E-02, A_8 = 1.380E-03, A_{10} = 1.831E-04, A_{12} = -4.237E-04, A_{14} = -1.611E-04$ Eleventh Surface $k = -1.019E+01, A_4 = -1.770E-01, A_6 = 8.804E-02, A_8 = -3.015E-02, A_{10} = 4.743E-03, A_{12} = -2.921E-04, A_{14} = 4.119E-05, A_{16} = -1.270E-05$ The values of the respective conditional expressions are as follows:

R4f/R3r=−0.69
f3/f=−29.18
f12/f45=−0.88
f45/f=−1.10
f2/f3=0.04

Accordingly, the imaging lens of Numerical Data Example 2 satisfies the above-described conditional expressions. Therefore, according to the imaging lens, it is achievable to satisfactorily correct aberrations in spite of a wide angle thereof. In addition, the ratio, the sum La of surface spacing on the optical axis X divided by the maximum image height Hm×2, is 0.61, so that low profile of the imaging lens is suitably attained.

Figure 5:
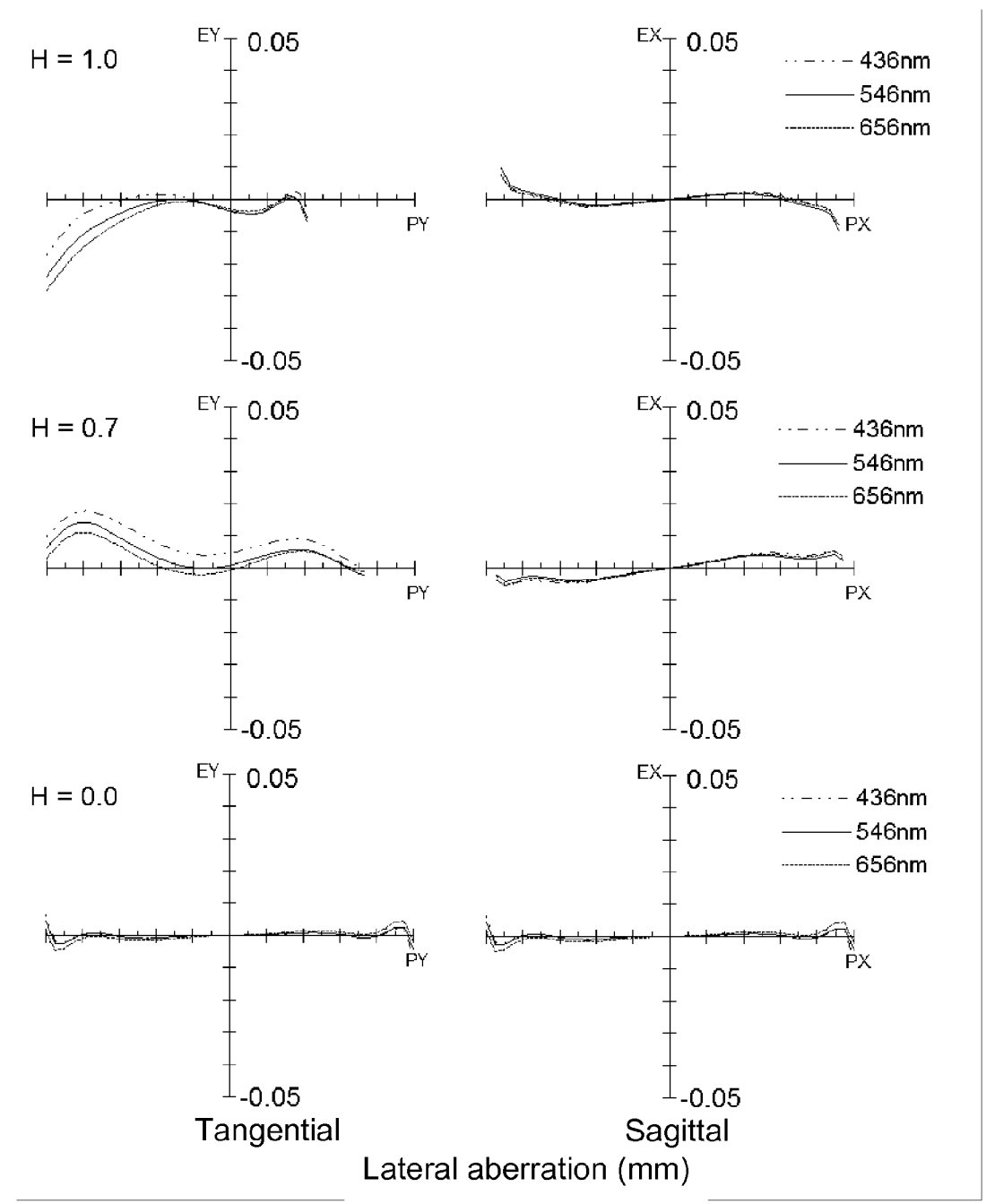
FIG. 5 is an aberration diagram showing a lateral aberration of the imaging lens of FIG. 4.
Figure 6:
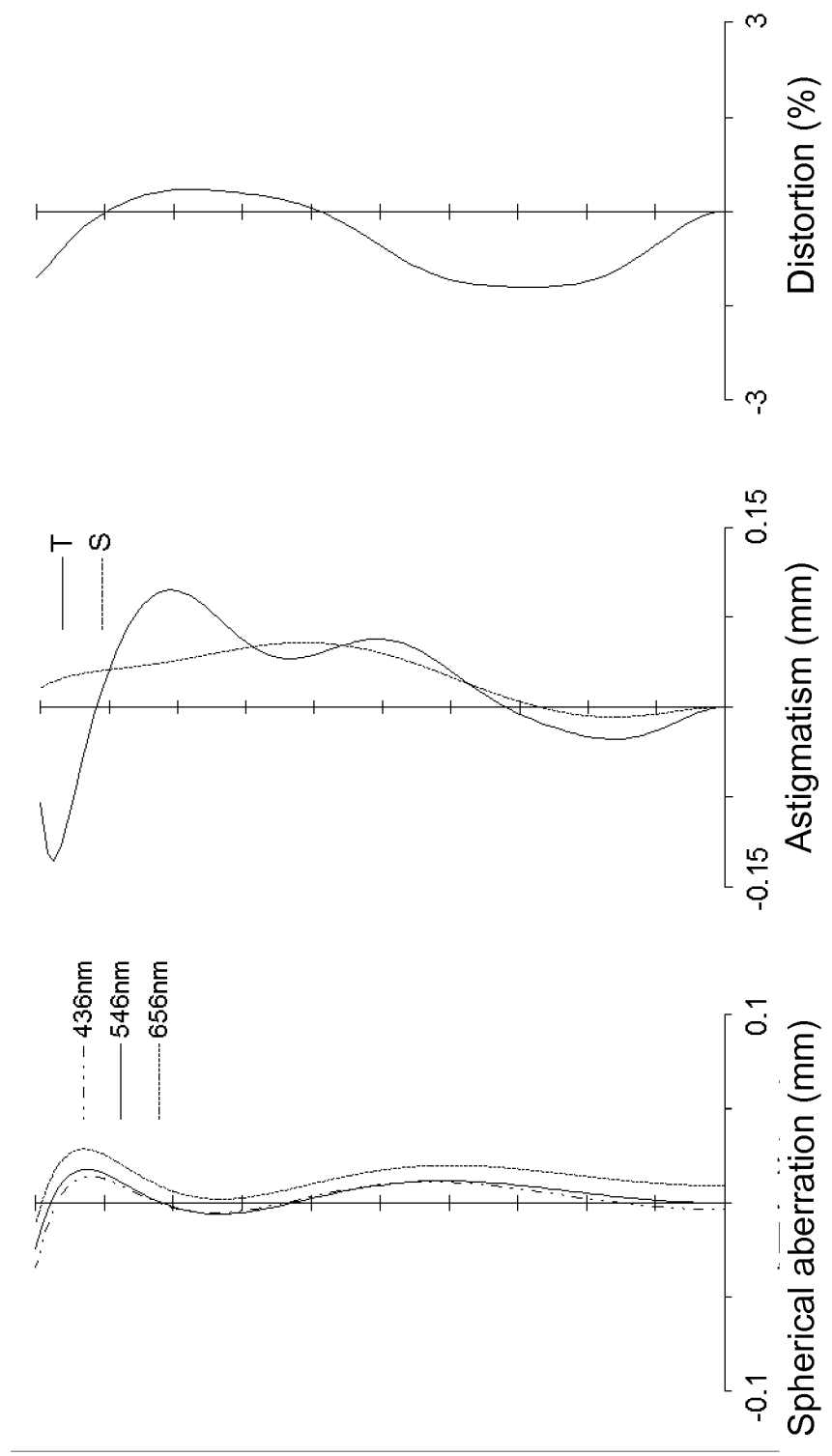
FIG. 6 is an aberration diagram showing a spherical aberration, astigmatism, and a distortion of the imaging lens of FIG. 4.
Figure 7:
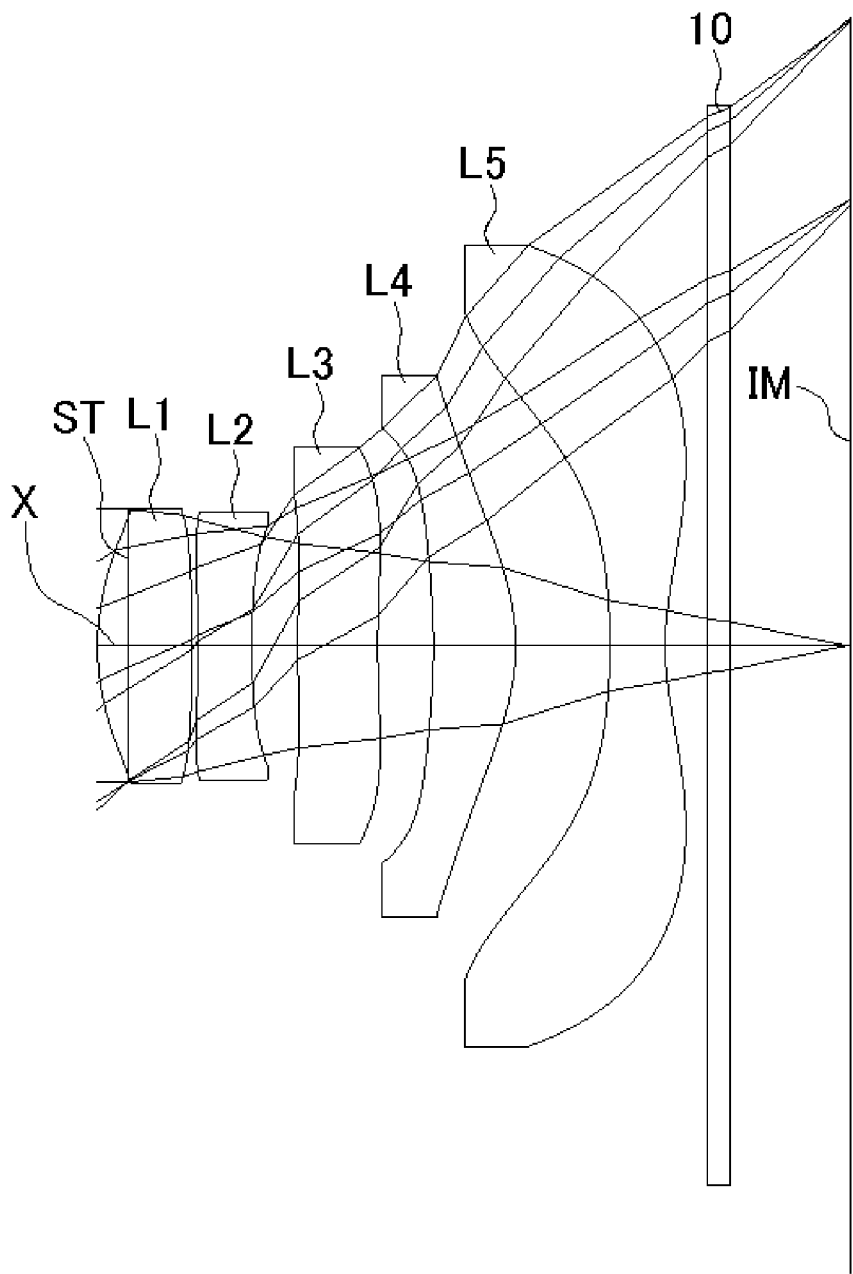
FIG. 7 shows a sectional view of a schematic configuration of an imaging lens in Numerical Data Example 3.

FIG. 5 shows the lateral aberration that corresponds to the image height ratio H of the imaging lens, and FIG. 6 shows a spherical aberration (mm), astigmatism (mm), and a distortion (%), respectively, in the imaging lens of Numerical Data Example 2. As shown in FIGS. 5 and 6, also in the imaging lens of Numerical Data Example 2, it is achievable to satisfactorily correct the aberrations.

Numerical Data Example 3

Basic data are shown below.

f = 3.19 mm, Fno = 2.5, ω = 42.9°
Unit: mm

Surface Data

| Surface Number i | r | d | nd | vd |
|---|---|---|---|---|
| (Object) | ∞ | ∞ | | |
| 1 (Stop) | ∞ | −0.140 | | |
| 2* | 1.186 | 0.440 | 1.544 | 55.6 (= vd1) |
| 3* | −10.620 | 0.030 | | |
| 4* | −4.854 | 0.250 | 1.638 | 23.3 (= vd2) |
| 5* | 4.589 | 0.214 | | |
| 6* | 6.439 | 0.372 | 1.535 | 56.1 (= vd3) |
| 7* | 5.148 (=R3r) | 0.259 | | |
| 8* | −3.178 (=R4f) | 0.383 | 1.544 | 55.6 (= vd4) |
| 9* | −0.997 | 0.438 | | |
| 10* | −3.606 | 0.258 | 1.525 | 56.0 (= vd5) |
| 11* | 1.294 | 0.200 | | |
| 12 | ∞ | 0.100 | 1.517 | 64.2 |
| 13 | ∞ | 0.566 | | |
| (Image plane) | ∞ | | | | f1 = 1.99 mm
f2 = −3.66 mm
f3 = −53.39 mm
f4 = 2.51 mm
f5 = −1.78 mm
f12 = 3.57 mm
f45 = −15.96 mm
La = 3.48 mm
Hm = 2.96

Aspheric Surface Data

Second Surface $k = -9.967E-01, A_4 = 1.679E-02, A_6 = -1.404E-01, A_8 = 9.485E-02, A_{10} = -1.274$ Third Surface $k = 0.000, A_4 = -8.358E-02, A_6 = -1.719E-01, A_8 = 1.500E-02, A_{10} = -1.034, A_{12} = 1.251$ Fourth Surface $k = 0.000, A_4 = 2.357E-01, A_6 = 2.274E-01, A_8 = -2.298E-01, A_{10} = -1.029, A_{12} = 3.089$ Fifth Surface $k = 0.000, A_4 = 2.833E-01, A_6 = 4.201E-01, A_8 = -4.506E-01, A_{10} = 2.221E-01, A_{12} = 2.297, A_{14} = -1.953$ -continued f = 3.19 mm, Fno = 2.5, ω = 42.9°

Sixth Surface k = 0.000, $A_4$ = −3.164E−01, $A_6$ = 1.427E−01, $A_8$ = 2.082E−01, $A_{10}$ = −3.453E−01, $A_{12}$ = −2.159E−01, $A_{14}$ = 4.198E−02, $A_{16}$ = 1.585
Seventh Surface k = 9.156E−01, $A_4$ = −1.971E−01, $A_6$ = −8.343E−02, $A_8$ = 6.876E−02, $A_{10}$ = −1.074E−01, $A_{12}$ = 6.711E−02, $A_{14}$ = 8.789E−02, $A_{16}$ = −6.472E−02
Eighth Surface k = −1.713E+01, $A_4$ = 1.202E−01, $A_6$ = −1.585E−01, $A_8$ = −9.346E−02, $A_{10}$ = 4.790E−02, $A_{12}$ = −2.388E−02, $A_{14}$ = 6.872E−03
Ninth Surface k = −4.159, $A_4$ = 3.945E−03, $A_6$ = 1.515E−01, $A_8$ = −1.821E−01, $A_{10}$ = 8.369E−02, $A_{12}$ = −1.243E−02, $A_{14}$ = −4.632E−04
Tenth Surface k = 0.000, $A_4$ = −2.247E−01, $A_6$ = 7.433E−02, $A_8$ = 7.767E−04, $A_{10}$ = 2.755E−04, $A_{12}$ = −3.037E−04, $A_{14}$ = −1.001E−04
Eleventh Surface k = −1.188E+01, $A_4$ = −1.773E−01, $A_6$ = 8.498E−02, $A_8$ = −2.959E−02, $A_{10}$ = 4.848E−03, $A_{12}$ = −3.135E−04, $A_{14}$ = 2.946E−05, $A_{16}$ = −1.315E−05

The values of the respective conditional expressions are as follows:
R4f/R3r=−0.62
f3/f=−16.72
f12/f45=−0.22
f45/f=−5.00
f2/f3=0.07

Accordingly, the imaging lens of Numerical Data Example 3 satisfies the above-described conditional expressions. Therefore, according to the imaging lens, it is achievable to satisfactorily correct aberrations in spite of a wide angle thereof. In addition, the ratio, the sum La of surface spacing on the optical axis X divided by the maximum image height Hm×2, is 0.59, so that low profile of the imaging lens is suitably attained.

Figure 8:
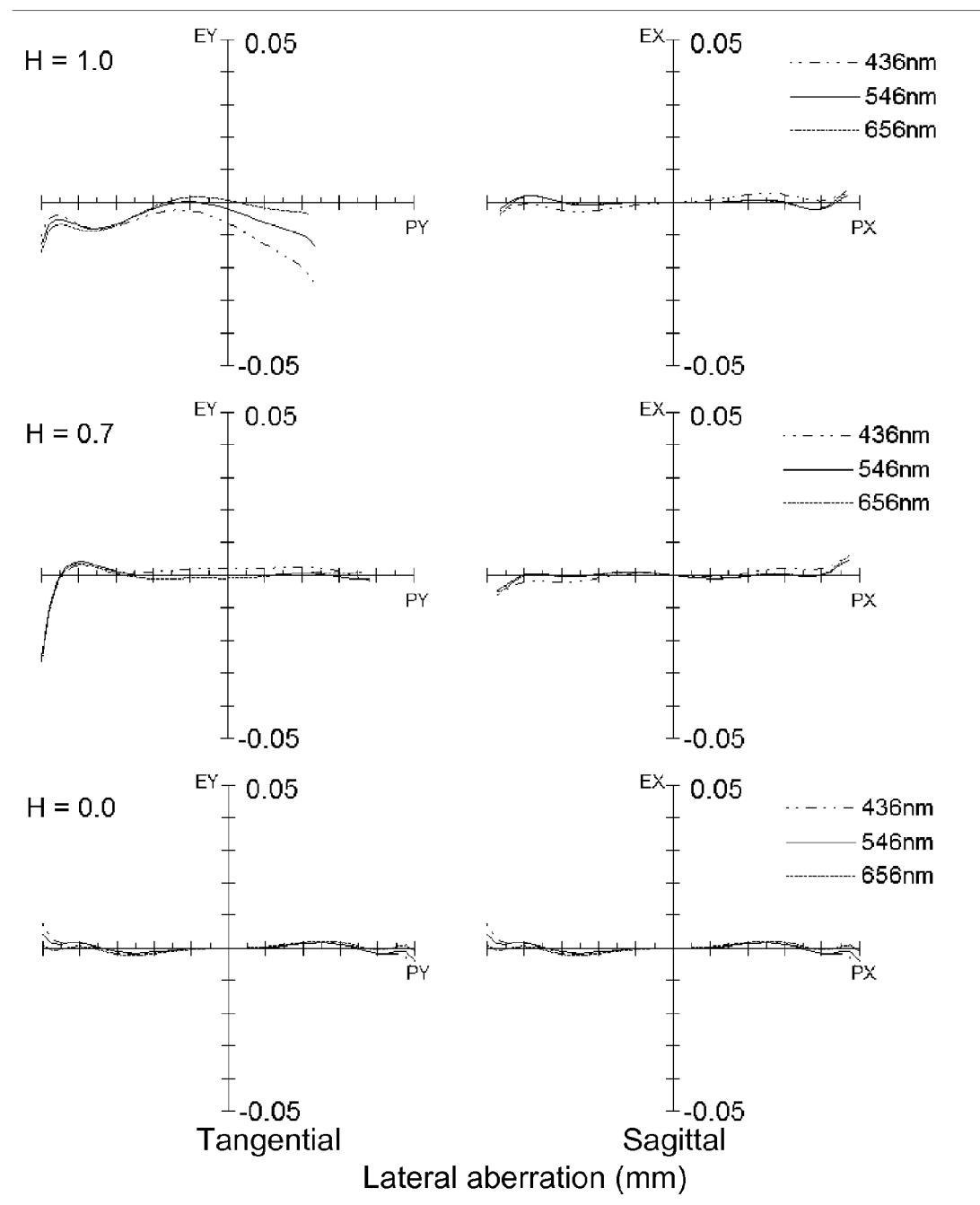
FIG. 8 is an aberration diagram showing a lateral aberration of the imaging lens of FIG. 7.
Figure 9:
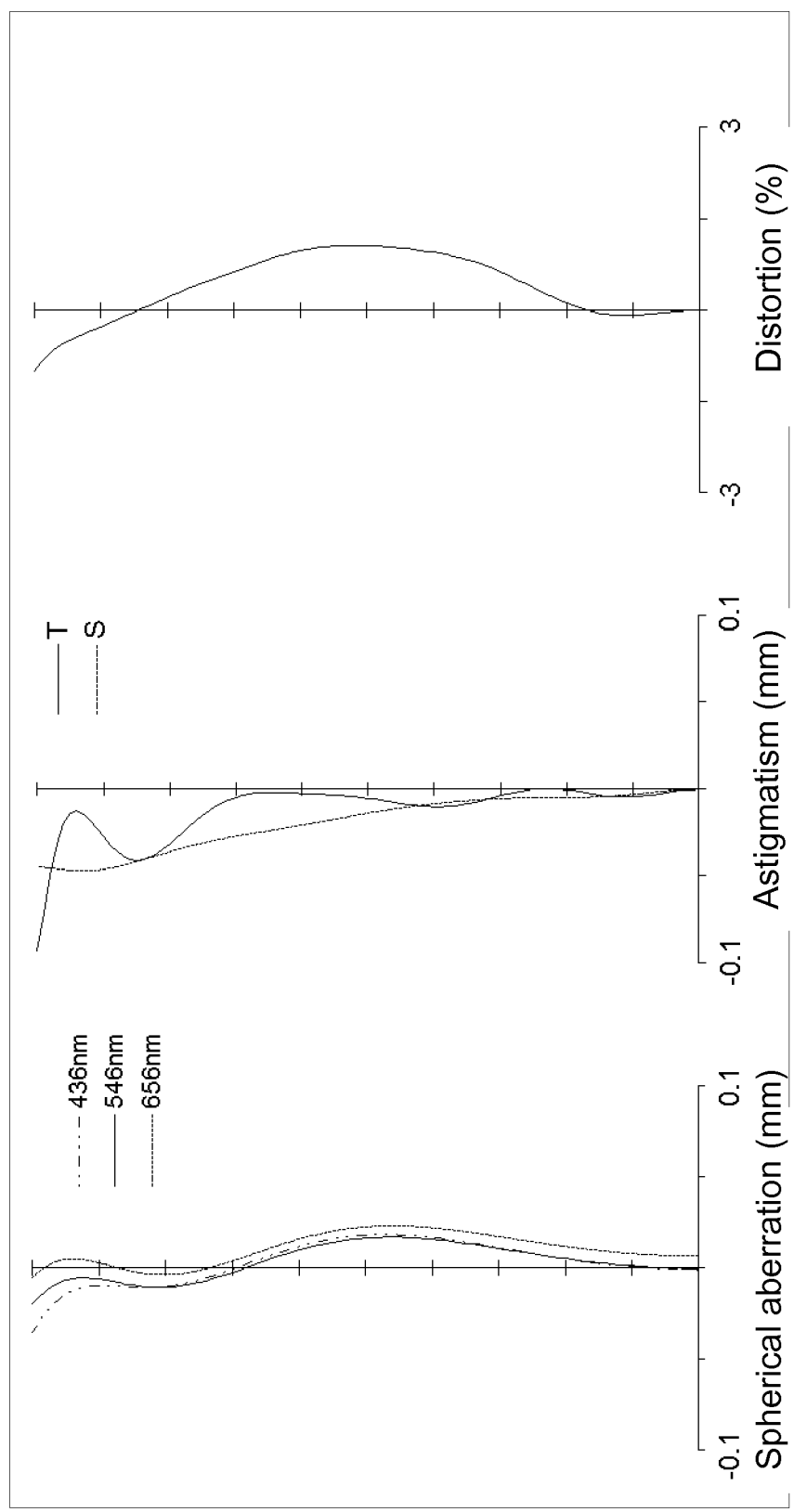
FIG. 9 is an aberration diagram showing a spherical aberration, astigmatism, and a distortion of the imaging lens of FIG. 7.
Figure 10:
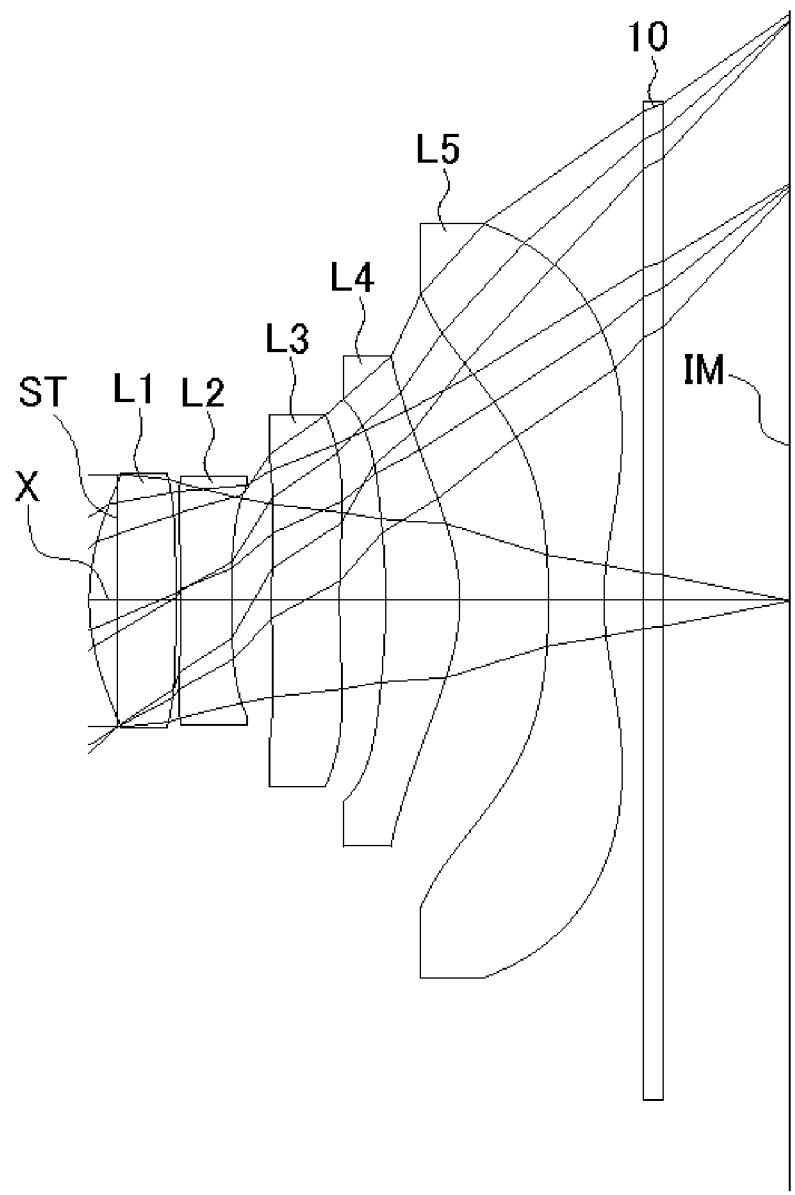
FIG. 10 shows a sectional view of a schematic configuration of an imaging lens in Numerical Data Example 4.

FIG. 8 shows the lateral aberration that corresponds to the image height ratio H of the imaging lens and FIG. 9 shows a spherical aberration (mm), astigmatism (mm), and a distortion (%), respectively, in the imaging lens of Numerical Data Example 3. As shown in FIGS. 8 and 9, according to the imaging lens of Numerical Data Example 3, it is achievable to satisfactorily correct the aberrations.

Numerical Data Example 4

Basic data are shown below.

f = 3.21 mm, Fno = 2.5, ω = 42.7°
Unit: mm

Surface Data

| Surface Number i | r | d | nd | vd |
|---|---|---|---|---|
| (Object) | ∞ | ∞ | | |
| 1 (Stop) | ∞ | −0.140 | | |
| 2* | 1.177 | 0.434 | 1.544 | 55.6 (= vd1) |
| 3* | −12.862 | 0.028 | | |
| 4* | −4.401 | 0.250 | 1.638 | 23.3 (= vd2) |
| 5* | 5.038 | 0.203 | | |
| 6* | 5.616 | 0.341 | 1.535 | 56.1 (= vd3) |
| 7* | 4.858 (=R3r) | 0.232 | | |
| 8* | −2.967 (=R4f) | 0.371 | 1.544 | 55.6 (= vd4) |
| 9* | −0.986 | 0.444 | | |
| 10* | −4.108 | 0.277 | 1.544 | 55.6 (= vd5) |
| 11* | 1.332 | 0.200 | | |
| 12 | ∞ | 0.100 | 1.517 | 64.2 |
| 13 | ∞ | 0.629 | | |
| (Image plane) | ∞ | | | | f1 = 2.00 mm
f2 = −3.64 mm
f3 = −79.75 mm
f4 = 2.55 mm
f5 = −1.82 mm
f12 = 3.66 mm
f45 = −17.62 mm
La = 3.47 mm
Hm = 2.96

Aspheric Surface Data

Second Surface k = −9.963E−01, $A_4$ = 2.147E−02, $A_6$ = −1.055E−01, $A_8$ = 1.377E−01, $A_{10}$ = −1.386
Third Surface k = 0.000, $A_4$ = −7.605E−02, $A_6$ = −1.713E−01, $A_8$ = 6.746E−03, $A_{10}$ = −1.043, $A_{12}$ = 1.136
Fourth Surface k = 0.000, $A_4$ = 2.247E−01, $A_6$ = 2.315E−01, $A_8$ = −2.535E−01, $A_{10}$ = −9.557E−01, $A_{12}$ = 2.582
Fifth Surface k = 0.000, $A_4$ = 2.898E−01, $A_6$ = 4.143E−01, $A_8$ = −4.867E−01, $A_{10}$ = 2.994E−01, $A_{12}$ = 1.775, $A_{14}$ = −1.444
Sixth Surface k = 0.000, $A_4$ = −3.181E−01, $A_6$ = 1.640E−01, $A_8$ = 2.458E−01, $A_{10}$ = −2.798E−01, $A_{12}$ = −3.295E−01, $A_{14}$ = 1.067E−01, $A_{16}$ = 9.332E−01
Seventh Surface k = 4.184, $A_4$ = −1.953E−01, $A_6$ = −8.279E−02, $A_8$ = 6.384E−02, $A_{10}$ = −5.578E−02, $A_{12}$ = 5.403E−02, $A_{14}$ = 6.779E−02, $A_{16}$ = −6.472E−02
Eighth Surface k = −2.132E+01, $A_4$ = 1.207E−01, $A_6$ = −1.586E−01, $A_8$ = −9.290E−02, $A_{10}$ = 5.435E−02, $A_{12}$ = −1.712E−02, $A_{14}$ = 1.238E−02
Ninth Surface k = −4.042, $A_4$ = 6.813E−03, $A_6$ = 1.551E−01, $A_8$ = −1.830E−01, $A_{10}$ = 8.572E−02, $A_{12}$ = −1.331E−02, $A_{14}$ = −3.064E−04
Tenth Surface k = 0.000, $A_4$ = −2.238E−01, $A_6$ = 7.239E−02, $A_8$ = 4.467E−04, $A_{10}$ = 4.196E−04, $A_{12}$ = −2.731E−04, $A_{14}$ = −1.032E−04
Eleventh Surface k = −1.222E+01, $A_4$ = −1.802E−01, $A_6$ = 8.827E−02, $A_8$ = −3.008E−02, $A_{10}$ = 5.054E−03, $A_{12}$ = −3.723E−04, $A_{14}$ = 4.251E−05, $A_{16}$ = −1.352E−05

The values of the respective conditional expressions are as follows:
R4f/R3r=−0.61
f3/f=−24.83
f12/f45=−0.21
f45/f=−5.49
f2/f3=0.05

Accordingly, the imaging lens of Numerical Data Example 4 satisfies the above-described conditional expressions. Therefore, according to the imaging lens, it is achievable to satisfactorily correct aberrations in spite of a wide angle thereof. In addition, the ratio, the sum La of surface spacing on the optical axis X divided by the maximum image height Hm×2, is 0.59, so that the imaging lens has suitably low profile.

Figure 11:
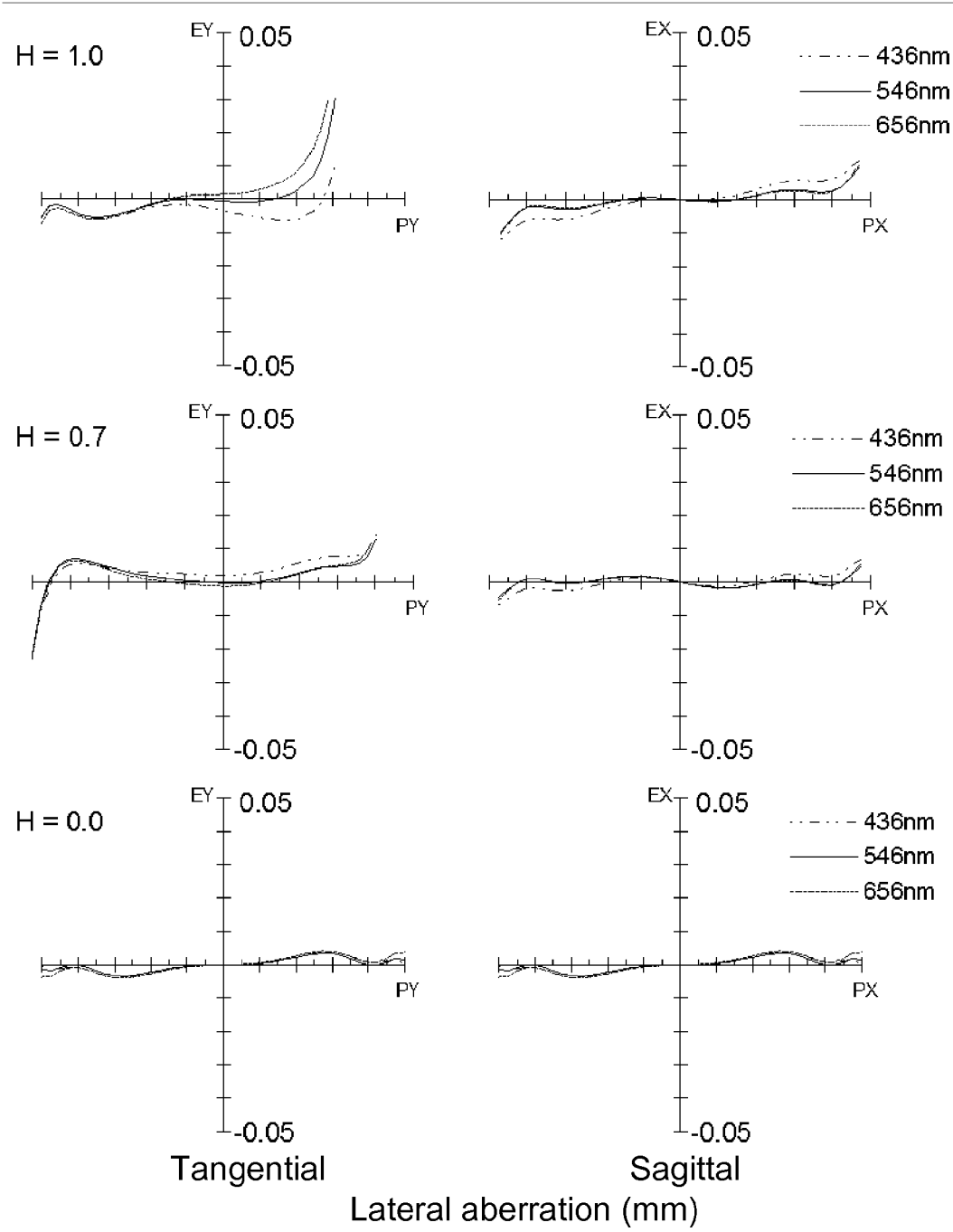
FIG. 11 is an aberration diagram showing a lateral aberration of the imaging lens of FIG. 10.
Figure 12:
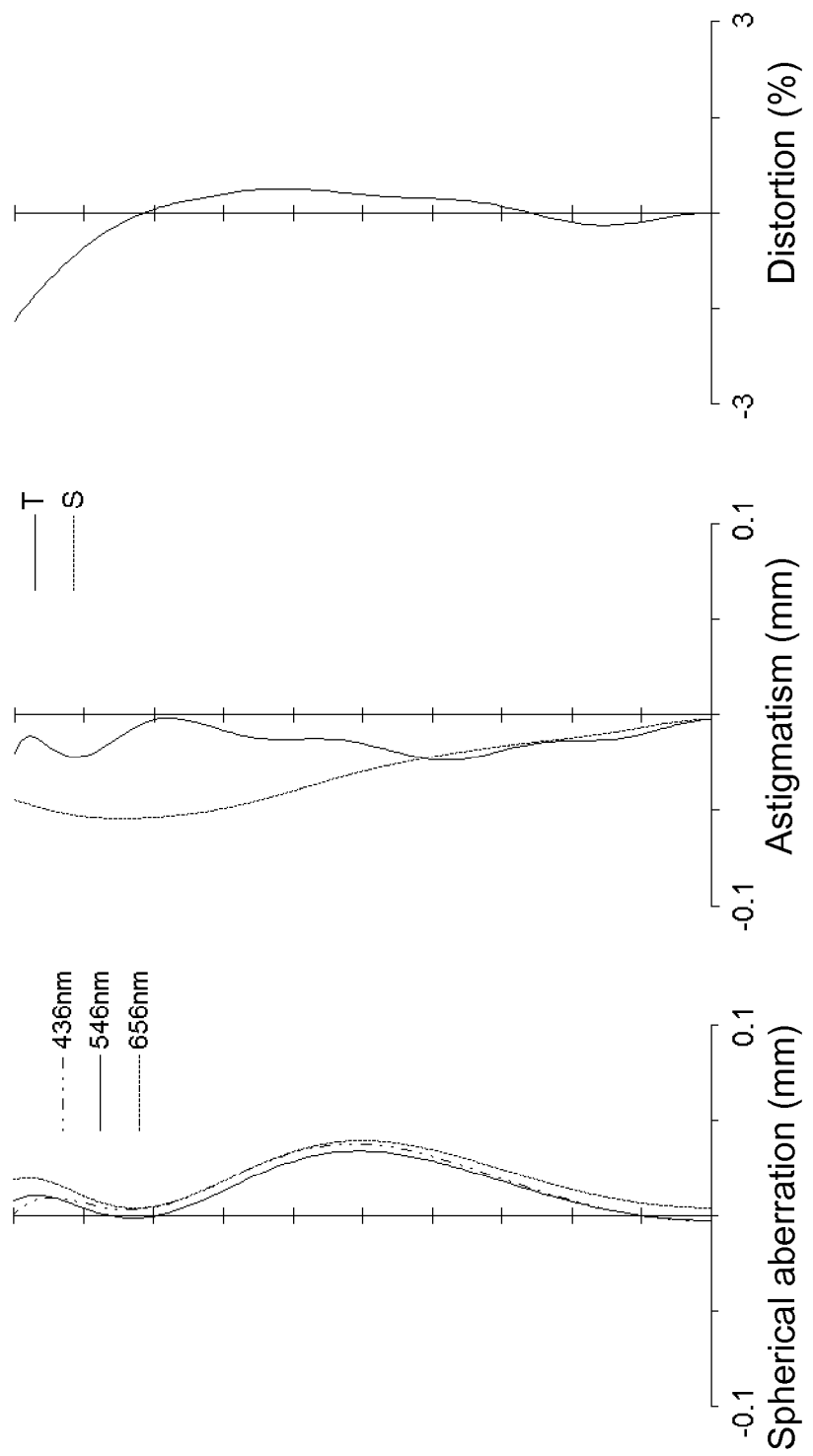
FIG. 12 is an aberration diagram showing a spherical aberration, astigmatism, and a distortion of the imaging lens of FIG. 10.
Figure 13:
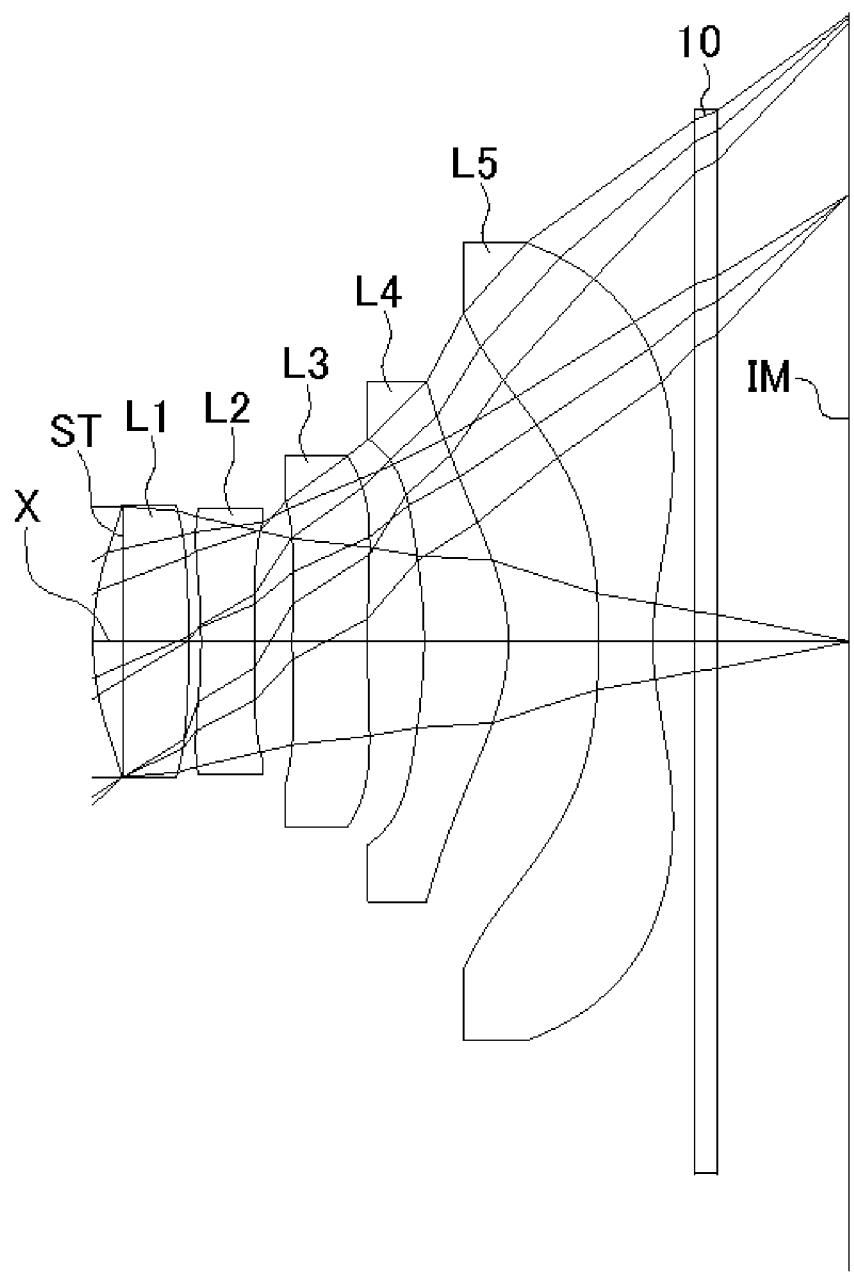
FIG. 13 shows a sectional view of a schematic configuration of an imaging lens in Numerical Data Example 5.

FIG. 11 shows the lateral aberration that corresponds to the image height ratio H of the imaging lens and FIG. 12 shows a spherical aberration (mm), astigmatism (mm), and a distortion (%), respectively, in the imaging lens of Numerical Data Example 4. As shown in FIGS. 11 and 12, according to the imaging lens of Numerical Data Example 4, it is achievable to satisfactorily correct the aberrations.

Numerical Data Example 5

Basic data are shown below.

f = 3.19 mm, Fno = 2.5, ω = 42.9°
Unit: mm

Surface Data

| Surface Number i | r | d | nd | vd |
|---|---|---|---|---|
| (Object) | ∞ | ∞ | | |
| 1 (Stop) | ∞ | −0.140 | | |
| 2* | 1.268 | 0.449 | 1.544 | 55.6 (= vd1) |
| 3* | −6.854 | 0.057 | | |
| 4* | −2.630 | 0.249 | 1.638 | 23.3 (= vd2) |
| 5* | −116.817 | 0.179 | | |
| 6* | 6.204 | 0.350 | 1.535 | 56.1 (= vd3) |
| 7* | 4.962 (= R3r) | 0.267 | | |
| 8* | −2.044 (= R4f) | 0.394 | 1.544 | 55.6 (= vd4) |
| 9* | −0.864 | 0.422 | | |
| 10* | −3.708 | 0.253 | 1.525 | 56.0 (= vd5) |
| 11* | 1.228 | 0.200 | | |
| 12 | ∞ | 0.100 | 1.517 | 64.2 |
| 13 | ∞ | 0.621 | | |
| (Image plane) | ∞ | | | | f1 = 2.01 mm
f2 = −4.22 mm
f3 = −51.40 mm
f4 = 2.46 mm
f5 = −1.73 mm
f12 = 3.36 mm
f45 = −11.77 mm
La = 3.51 mm
Hm = 2.96

Aspheric Surface Data

Second Surface k = −1.152, $A_4$ = 3.501E−03, $A_6$ = −1.634E−01, $A_8$ = −2.811E−01, $A_{10}$ = −3.914E−01
Third Surface k = 0.000, $A_4$ = −1.286E−01, $A_6$ = −5.334E−02, $A_8$ = 1.076E−01, $A_{10}$ = −1.282, $A_{12}$ = 1.649
Fourth Surface k = 0.000, $A_4$ = 3.210E−01, $A_6$ = 3.858E−01, $A_8$ = −3.596E−01, $A_{10}$ = −1.138, $A_{12}$ = 3.001
Fifth Surface k = 0.000, $A_4$ = 3.452E−01, $A_6$ = 3.284E−01, $A_8$ = −4.639E−01, $A_{10}$ = 2.984E−01, $A_{12}$ = 1.845, $A_{14}$ = −2.935
Sixth Surface k = 0.000, $A_4$ = −3.907E−01, $A_6$ = 1.093E−01, $A_8$ = 1.397E−02, $A_{10}$ = −2.988E−01, $A_{12}$ = 9.038E−01, $A_{14}$ = 1.390, $A_{16}$ = −5.985
Seventh Surface k = −7.049E−01, $A_4$ = −1.959E−01, $A_6$ = −1.690E−01, $A_8$ = 4.515E−02, $A_{10}$ = −8.626E−02, $A_{12}$ = 8.308E−02, $A_{14}$ = 9.941E−02, $A_{16}$ = −6.472E−02 f = 3.19 mm, Fno = 2.5, ω = 42.9°
Unit: mm

Eighth Surface k = −1.543E+01, $A_4$ = 1.193E−01, $A_6$ = −1.676E−01, $A_8$ = −1.222E−01, $A_{10}$ = 9.159E−03, $A_{12}$ = −4.530E−02, $A_{14}$ = 2.323E−02
Ninth Surface k = −3.578, $A_4$ = 8.147E−03, $A_6$ = 1.584E−01, $A_8$ = −1.794E−01, $A_{10}$ = 8.399E−02, $A_{12}$ = −1.299E−02, $A_{14}$ = −1.241E−03
Tenth Surface k = 0.000, $A_4$ = −2.145E−01, $A_6$ = 7.398E−02, $A_8$ = 4.527E−04, $A_{10}$ = 1.370E−04, $A_{12}$ = −3.469E−04, $A_{14}$ = −9.850E−05
Eleventh Surface k = −1.267E+01, $A_4$ = −1.835E−01, $A_6$ = 9.032E−02, $A_8$ = −2.976E−02, $A_{10}$ = 4.709E−03, $A_{12}$ = −3.381E−04, $A_{14}$ = 3.175E−05, $A_{16}$ = −1.132E−05

The values of the respective conditional expressions are as follows:
R4f/R3r=−0.41
f3/f=−16.11
f12/f45=−0.29
f45/f=−3.69
f2/f3=0.08

Accordingly, the imaging lens of Numerical Data Example 5 satisfies the above-described conditional expressions. Therefore, according to the imaging lens, it is achievable to satisfactorily correct aberrations in spite of a wide angle thereof. In addition, the ratio, the sum La of surface spacing on the optical axis X divided by the maximum image height Hm×2, is 0.59, so that low profile of the imaging lens is suitably attained.

Figure 14:
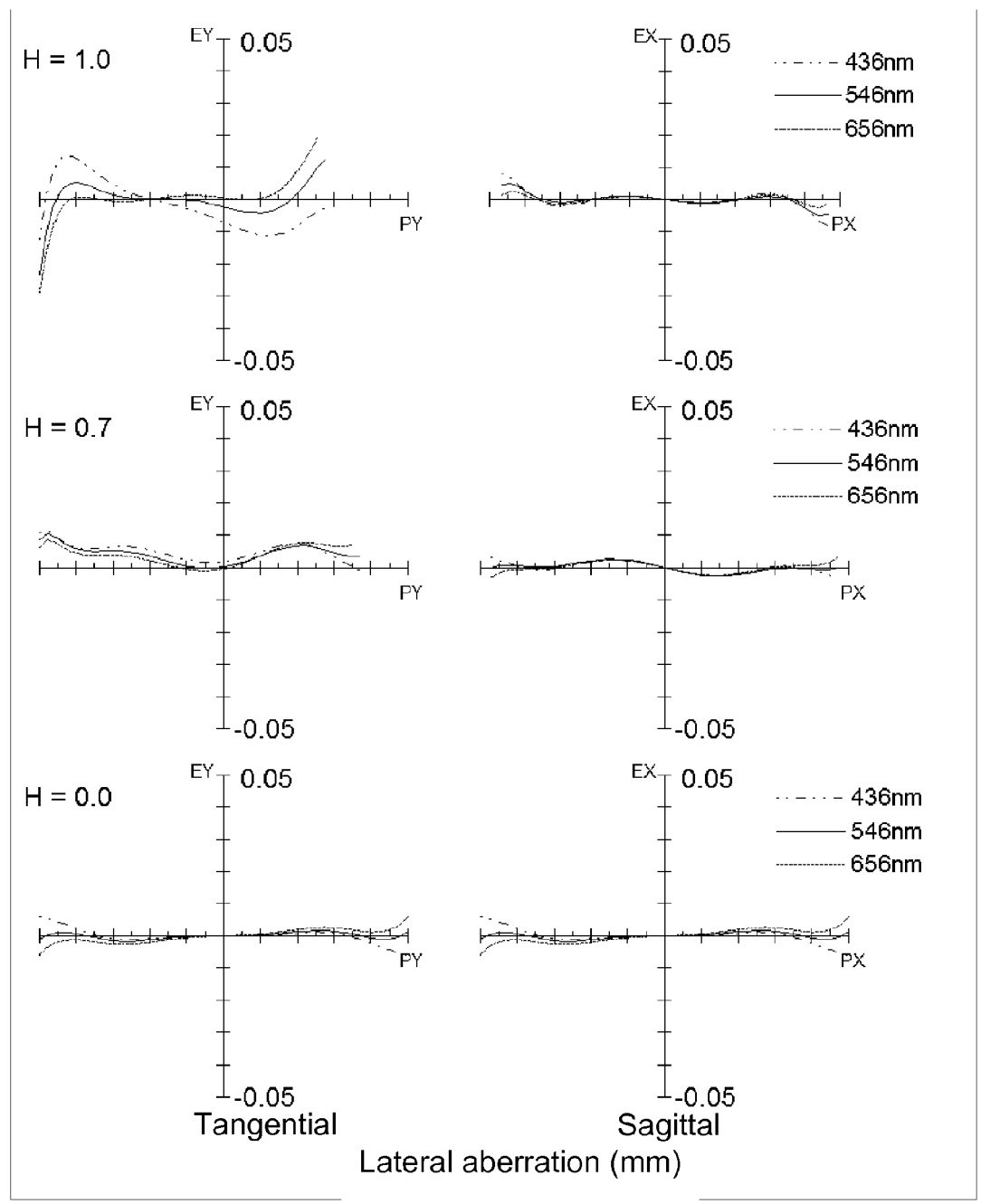
FIG. 14 is an aberration diagram showing a lateral aberration of the imaging lens of FIG. 13.
Figure 15:
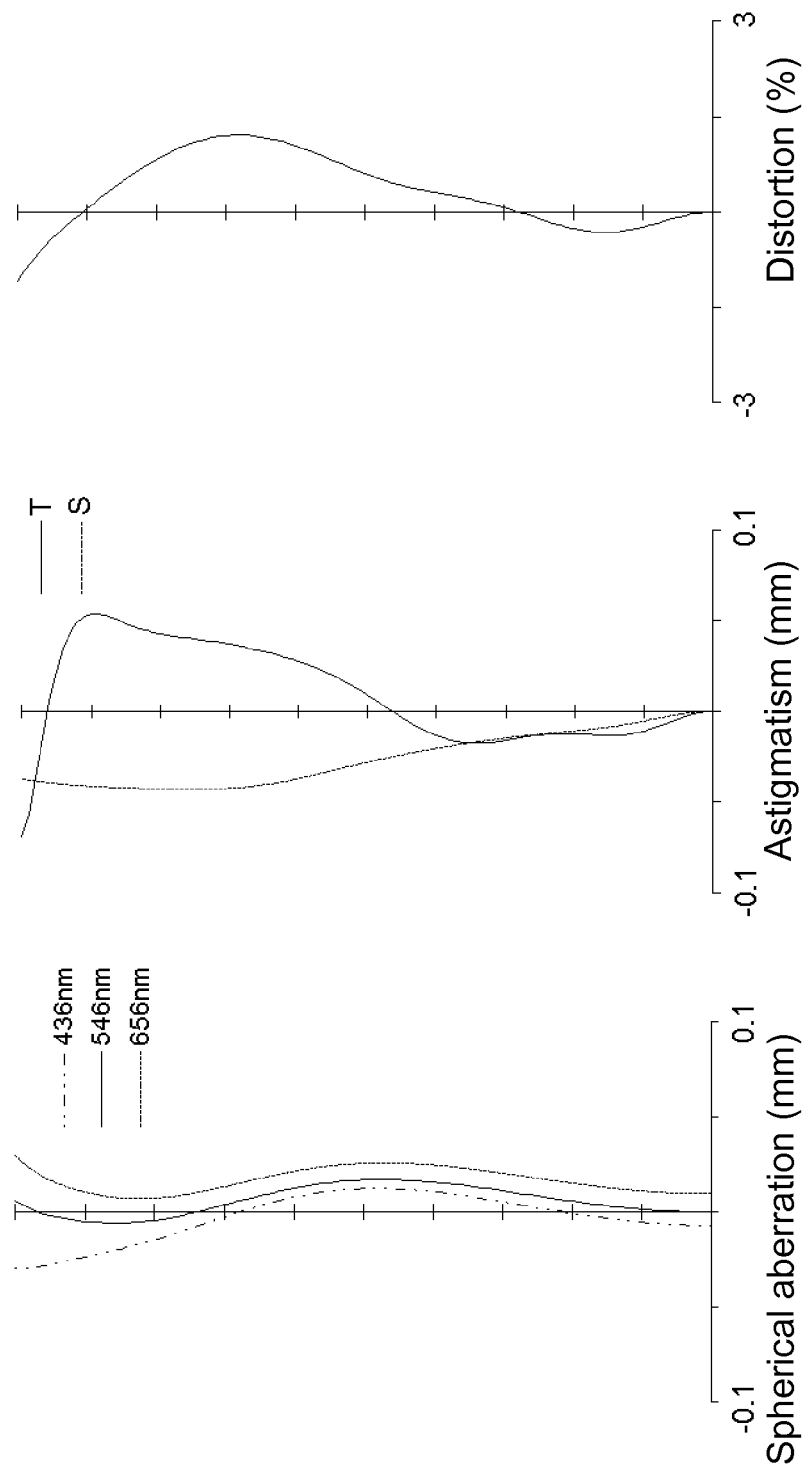
FIG. 15 is an aberration diagram showing a spherical aberration, astigmatism, and a distortion of the imaging lens of FIG. 13.

FIG. 14 shows the lateral aberration that corresponds to the image height ratio H of the imaging lens and FIG. 15 shows a spherical aberration (mm), astigmatism (mm), and a distortion (%), respectively, in the imaging lens of Numerical Data Example 5. As shown in FIGS. 14 and 15, according to the imaging lens of Numerical Data Example 5, it is achievable to satisfactorily correct the aberrations.

According to the imaging lens of the embodiment described above, it is achievable to obtain an angle of view (2ω) of about 80°. Here, very wide angle of view, 79.4° to 85.8°, are achieved in the imaging lenses of Numerical Data Examples 1 to 5. According to the imaging lens of the embodiment, it is possible to take an image of wider range than that of a conventional imaging lens.

Furthermore, in these years, it is more common to combine a high-resolution imaging element with an imaging lens for a purpose of improving camera performances. In case of those high-resolution imaging elements, a light-receiving area of each pixel is reduced, so that an image taken tends to be dark. As a method to correct this issue, there is one which improves light-receiving sensitivity of an imaging element using an electrical circuit. However, when light-receiving sensitivity increases, a noise component that does not directly contribute to image formation is also amplified, so that it requires another circuit to reduce noise. The values of Fno in the imaging lenses of Numerical Data Examples 1 to 5 are very small, as small as 2.5 to 2.8. According to the imaging lens of the embodiment, it is possible to obtain sufficiently bright image without such electrical circuits described above.

Here, according to the above-described respective Numerical Data Examples, surfaces of each lens are formed as an aspheric surface, but when it is allowed in view of a total length of the imaging lens or required optical performances, all or a part of surfaces of lenses that compose the imaging lens can be formed as spherical surfaces.

Therefore, when the imaging lens of the embodiment is applied in an imaging optical system such as cellular phones, smartphones, digital still cameras, portable information terminals, security cameras, vehicle onboard cameras, and network cameras, it is possible to provide a small-sized camera with satisfactorily corrected aberrations in spite of a wide angle thereof.

The invention is applicable in an imaging lens in a device that requires a wide angle of imaging view as well as satisfactory aberration correcting ability, for example an imaging lens to be mounted in a device such as cellular phones, smartphones, security cameras, and vehicle onboard cameras.

The disclosure of Japanese Patent Application No. 2013-094811, filed on Apr. 27, 2013, is incorporated in the application by reference.

While the invention has been explained with reference to the specific embodiments of the invention, the explanation is illustrative and the invention is limited only by the appended claims.

What is claimed is:

1. An imaging lens comprising:
a first lens having positive refractive power;
a second lens having negative refractive power;
a third lens having negative refractive power;
a fourth lens; and
a fifth lens having negative refractive power, arranged in this order from an object side to an image plane side,
wherein said first lens is formed in a shape so that a surface thereof on the object side has a positive curvature radius,
said third lens is formed in a shape so that a surface thereof on the image plane side has a positive curvature radius,
said fifth lens is formed in a shape so that a surface thereof on the object side has a negative curvature radius, and a surface thereof on the image plane side has a positive curvature radius, and
said first lens has an Abbe's number vd1, said second lens has an Abbe's number vd2, said third lens has an Abbe's number vd3, said second lens has a focal length f2, and said third lens has a focal length f3 so that the following conditional expressions are satisfied:

$$45<vd1<75,$$

$$20<vd2<35,$$

$$45<vd3<75,$$

$$0.04 \leq f2/f3<0.1.$$

2. The imaging lens according to claim 1, wherein said second lens is formed in a shape so that a surface thereof on the object side has a negative curvature radius.

3. The imaging lens according to claim 1, wherein said fourth lens and said fifth lens have a composite focal length f45 so that the following conditional expression is satisfied:

$$-10.0<f45/f<-1.0,$$

where f is a focal length of a whole lens system.

4. The imaging lens according to claim 1, wherein said first lens and said second lens have a composite focal length f12, and said fourth lens and said fifth lens have a composite focal length f45 so that the following conditional expression is satisfied:

$$-1.0<f12/f45<-0.2.$$

5. The imaging lens according to claim 1, wherein said third lens has a focal length f3 so that the following conditional expression is satisfied:

$$-30<f3/f<-15,$$

where f is a focal length of a whole lens system.

6. The imaging lens according to claim 1, wherein said third lens is formed in the shape so that the surface thereof on the image plane side has a curvature radius R3r, and said fourth lens is formed in the shape so that the surface thereof on the object side has a curvature radius R4f so that the following conditional expression is satisfied:

$$-1.0<R4f/R3r<-0.2.$$

7. The imaging lens according to claim 1, wherein said first lens is arranged so that the surface thereof on the object side is away from the image plane by a distance La on an optical axis thereof so that the following conditional expression is satisfied:

$$La/(Hm \times 2) \leq 0.61,$$

where Hm is a maximum image height.

8. The imaging lens according to claim 1, further comprising an aperture stop disposed between a tangent plane at a vertex of the surface of the first lens on the object side and an intersection between the surface of the first lens on the image plane side and an optical axis thereof.

9. The imaging lens according to claim 1, wherein said fourth lens has an Abbe's number vd4, and said fifth lens has an Abbe's number vd5 so that the following conditional expressions are satisfied:

$$45<vd4<75,$$

$$45<vd5<75.$$

10. An imaging lens comprising:
a first lens having positive refractive power;
a second lens having negative refractive power;
a third lens having negative refractive power;
a fourth lens; and
a fifth lens having negative refractive power, arranged in this order from an object side to an image plane side,
wherein said first lens is formed in a shape so that a surface thereof on the object side has a positive curvature radius,
said third lens is formed in a shape so that a surface thereof on the image plane side has a positive curvature radius,
said fifth lens is formed in a shape so that a surface thereof on the object side has a negative curvature radius, and a surface thereof on the image plane side has a positive curvature radius, and
said first lens has an Abbe's number vd1, said second lens has an Abbe's number vd2, said third lens has an Abbe's number vd3, and said imaging lens has an angle of view 2ω so that the following conditional expressions are satisfied:

$$45<vd1<75,$$

$$20<vd2<35,$$

$$45<vd3<75,$$

$$78° \leq 2\omega.$$

11. The imaging lens according to claim 10, wherein said second lens is formed in a shape so that a surface thereof on the object side has a negative curvature radius.

12. The imaging lens according to claim 10, wherein said fourth lens and said fifth lens have a composite focal length f45 so that the following conditional expression is satisfied:

$-10.0<f45/f<-1.0$, where f is a focal length of a whole lens system.

13. The imaging lens according to claim 10, wherein said first lens and said second lens have a composite focal length f12, and said fourth lens and said fifth lens have a composite focal length f45 so that the following conditional expression is satisfied:

$-1.0<f12/f45<-0.2$.

14. The imaging lens according to claim 10, wherein said third lens has a focal length f3 so that the following conditional expression is satisfied:

$-30<f3/f<-15$, where f is a focal length of a whole lens system.

15. The imaging lens according to claim 10, wherein said third lens is formed in the shape so that the surface thereof on the image plane side has a curvature radius R3r, and said fourth lens is formed in the shape so that the surface thereof on the object side has a curvature radius R4f so that the following conditional expression is satisfied:

$-1.0<R4f/R3r<-0.2$.

16. The imaging lens according to claim 10, wherein said first lens is arranged so that the surface thereof on the object side is away from the image plane by a distance La on an optical axis thereof so that the following conditional expression is satisfied:

$La/(Hm\times 2)\leq 0.61$, where Hm is a maximum image height.

17. The imaging lens according to claim 10, further comprising an aperture stop disposed between a tangent plane at a vertex of the surface of the first lens on the object side and an intersection between the surface of the first lens on the image plane side and an optical axis thereof.

18. The imaging lens according to claim 10, wherein said fourth lens has an Abbe's number vd4, and said fifth lens has an Abbe's number vd5 so that the following conditional expressions are satisfied:

$45<vd4<75$, $45<vd5<75$.

* * * * *